(12) United States Patent
Ikeda

(10) Patent No.: US 11,998,888 B2
(45) Date of Patent: Jun. 4, 2024

(54) PARTICLE AGGREGATE MANUFACTURING METHOD, ELECTRODE PLATE MANUFACTURING METHOD, AND PARTICLE AGGREGATE

(71) Applicant: TOYOTA JIDOSHA KABUSHIKI KAISHA, Toyota (JP)

(72) Inventor: Takenori Ikeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 198 days.

(21) Appl. No.: 17/559,324

(22) Filed: Dec. 22, 2021

(65) Prior Publication Data

US 2022/0111344 A1 Apr. 14, 2022

Related U.S. Application Data

(62) Division of application No. 16/441,454, filed on Jun. 14, 2019.

(30) Foreign Application Priority Data

Jul. 17, 2018 (JP) .................................. 2018-134441

(51) Int. Cl.
*B01J 2/10* (2006.01)
*B01F 29/64* (2022.01)
(Continued)

(52) U.S. Cl.
CPC ................. *B01J 2/10* (2013.01); *B01F 29/64* (2022.01); *H01M 4/0435* (2013.01);
(Continued)

(58) Field of Classification Search
CPC ............................. H01M 4/505; H01M 4/525
See application file for complete search history.

(56) References Cited

U.S. PATENT DOCUMENTS

| 5,772,930 A | 6/1998 | Hashimoto et al. |
| 2012/0148917 A1 | 6/2012 | Kobayashi et al. |

(Continued)

FOREIGN PATENT DOCUMENTS

| CN | 102484242 A | 5/2012 |
| CN | 105047857 A | 11/2015 |

(Continued)

OTHER PUBLICATIONS

English machine translation of JP 2016149194A (Year: 2016).*
English machine translation of JP 2011181229A (Year: 2011).*
English machine translation of JP 2005050582A (Year: 2005).*

*Primary Examiner* — Peter F Godenschwager
(74) *Attorney, Agent, or Firm* — Sughrue Mion, PLLC

(57) ABSTRACT

A manufacturing method of a particle aggregate aggregated with wet particles in which active material particles and conductive particles are evenly dispersed and a manufacturing method of an electrode body including the particle aggregate are provided. The manufacturing method of a particle aggregate includes a first step of obtaining a first mixture by mixing conductive particles with a binder dispersion in which binder is dispersed in a dispersion medium, a second step of obtaining a clay-like mixture by kneading the first mixture with active material particles, and a third step of obtaining the particle aggregate aggregated with wet particles formed of the clay-like mixture.

8 Claims, 15 Drawing Sheets

(51) Int. Cl.
  *H01M 4/02* (2006.01)
  *H01M 4/04* (2006.01)
  *H01M 4/505* (2010.01)
  *H01M 4/525* (2010.01)
  *H01M 4/62* (2006.01)
  *H01M 10/0525* (2010.01)
  *H01M 10/0585* (2010.01)

(52) U.S. Cl.
  CPC ........... *H01M 4/505* (2013.01); *H01M 4/525* (2013.01); *H01M 4/623* (2013.01); *H01M 10/0585* (2013.01); *H01M 2004/021* (2013.01); *H01M 10/0525* (2013.01); *H01M 2220/20* (2013.01)

(56) References Cited

U.S. PATENT DOCUMENTS

| | | |
|---|---|---|
| 2012/0156562 A1 | 6/2012 | Kobayashi et al. |
| 2012/0156563 A1 | 6/2012 | Kobayashi et al. |
| 2012/0160128 A1 | 6/2012 | Kobayashi et al. |
| 2012/0202114 A1 | 8/2012 | Madray et al. |
| 2014/0199590 A1 | 7/2014 | Tamaki et al. |
| 2015/0303480 A1 | 10/2015 | Hanazaki |
| 2016/0181651 A1 | 6/2016 | Tanihara et al. |
| 2016/0211504 A1 | 7/2016 | Uezono et al. |
| 2016/0244620 A1 | 8/2016 | Kobayashi et al. |
| 2017/0033347 A1 | 2/2017 | Murakami et al. |
| 2017/0033348 A1 | 2/2017 | Murakami et al. |
| 2017/0141373 A1 | 5/2017 | Murakami et al. |
| 2017/0157642 A1 | 6/2017 | Ozaki et al. |
| 2017/0170443 A1 | 6/2017 | Murakami et al. |
| 2018/0102534 A1 | 4/2018 | Mesuda |

FOREIGN PATENT DOCUMENTS

| | | | |
|---|---|---|---|
| CN | 105720238 A | | 6/2016 |
| CN | 107946537 A | | 4/2018 |
| JP | 09-180709 A | | 7/1997 |
| JP | 10-055801 A | | 2/1998 |
| JP | 2005050582 A | * | 2/2005 |
| JP | 2011181229 A | * | 9/2011 |
| JP | 2014-143064 A | | 8/2014 |
| JP | 2016149194 A | * | 8/2016 |
| JP | 2017-100103 A | | 6/2017 |
| JP | 2017-111963 A | | 6/2017 |
| JP | 2018-4579 A | | 1/2018 |
| JP | 2018-060678 A | | 4/2018 |
| JP | 2018-63828 A | | 4/2018 |
| JP | 2018-101518 A | | 6/2018 |
| KR | 10-2012-0069714 A | | 6/2012 |
| KR | 10-2014-0052039 A | | 5/2014 |
| KR | 101489042 B1 | | 2/2015 |
| KR | 10-2016-0089278 A | | 7/2016 |
| WO | 2012086186 A1 | | 6/2012 |
| WO | 2016031466 A1 | | 3/2016 |

* cited by examiner

PARTICLE AGGREGATE MANUFACTURING METHOD, ELECTRODE PLATE MANUFACTURING METHOD, AND PARTICLE AGGREGATE

CROSS-REFERENCE TO RELATED APPLICATIONS

This is a divisional of U.S. patent application Ser. No. 16/441,454, filed Jun. 14, 2019, which claims priority from Japanese Patent Application No. 2018-134441, filed Jul. 17, 2018, the entire contents of which are incorporated herein by reference including the specification, claims, drawings, and abstract.

BACKGROUND

Technical Field

The present disclosure relates to a method of manufacturing a particle aggregate formed of aggregated wet particles including active material particles, conductive particles, binder, and a dispersion medium, to a method of manufacturing an electrode plate using the particle aggregate, and to the particle aggregate.

Background

An electrode plate used for a power storage device such as a battery and a capacitor has been known as the one provided with an active material layer including active material particles, conductive particles, and binder and placed on a current collecting foil. This electrode plate is, for example, manufactured by the following method. A particle aggregate in which wet particles including the active material particles, the conductive particles, the binder, and a dispersion medium are aggregated is firstly prepared. Specifically, the particle aggregate formed of the wet particles is obtained by, for example, mixing and granulating the active material particles, the conductive particles, the binder, and the dispersion medium by use of an agitation-type mixer granulator for mixing and granulating the materials. Patent Document 1 describes one example of using an agitation-type mixer granulator for manufacturing the particle aggregate formed of the wet particles (see FIG. 1 and others of the Patent Document 1).

Another method is to provide a roller press machine including three rollers (a first roller, a second roller placed in parallel with the first roller, and a third roller placed in parallel with the second roller). The above-mentioned particle aggregate is made to pass through a first roller gap between the first roller and the second roller for rolling, so that an undried active material film is formed on the second roller. Subsequently, the undried active material film on the second roller is transferred onto a current colleting foil which has passed through a second roller gap between the second roller and the third roller. After that, the undried active material film on the current collecting foil is dried to form an active material layer. Thus, an electrode plate having an active material layer on a current collecting foil is manufactured.

RELATED ART DOCUMENTS

Patent Documents

Patent Document 1: JP2018-060678A

SUMMARY

Technical Problems

When an electrode plate is manufactured by a particle aggregate formed by the above agitation-type mixer granulator, however, some undried active material films are formed such that the active material particles and the conductive particles failed to be dispersed uniformly. The agitation-type mixer granulator has thus difficulty in uniform dispersion of the active material particles and the conductive particles, and some wet particles are formed of the active material particles and the conductive particles that are unevenly dispersed in the wet particles. Accordingly, when the particle aggregate including the above unevenly dispersed wet particles is rolled to form an undried active material film, the film turns out to be the one having uneven dispersion of the active material particles and the conductive particles.

The present disclosure has been made in view of the above circumstance and has a purpose of providing a manufacturing method of a particle aggregate in which wet particles including uniformly dispersed active material particles and conductive particles are aggregated, a manufacturing method of an electrode plate using the particle aggregate, and the particle aggregate.

Means of Solving the Problems

One aspect of the present disclosure to solve the above problem is to provide a manufacturing method of a particle aggregate formed of aggregated wet particles comprising active material particles, conductive particles, binder, and a dispersion medium, wherein the method includes: a first step of obtaining a primary mixture by mixing the conductive particles with a binder dispersion in which the binder is dispersed in the dispersion medium; a second step of obtaining a clay-like mixture by kneading the primary mixture with the active material particles; and a third step of obtaining the particle aggregate in which the wet particles formed of the clay-like mixture are aggregated.

In the above manufacturing method of the particle aggregate, the conductive particles and the binder dispersion are firstly mixed in the first step to obtain the primary mixture. If the active material particles and the conductive particles both having different bulk density are to be mixed concurrently with the viscous binder dispersion in which the binder is dispersed in the dispersion medium, the active material particles, the conductive particles, the binder, and the dispersion medium are sometimes hard to be uniformly dispersed. On the other hand, it has been confirmed that, when only the conductive particles are mixed with the viscous binder dispersion without concurrently adding the active material particles, the conductive particles are uniformly dispersed in the binder dispersion. Thus, the primary mixture achieving uniform dispersion of the conductive particles, the binder, and the dispersion medium can be obtained in the first step.

Subsequently, the clay-like mixture is obtained by kneading the primary mixture with the active material particles in the second step. It has been confirmed that formation of the primary mixture in the first step prior to kneading the primary mixture with the active material particles leads to uniform dispersion of the active material particles, the conductive particles, the binder, and the dispersion medium. Accordingly, the clay-like mixture achieving uniform dispersion of the active material particles, the conductive particles, the binder, and the dispersion medium can be obtained in the second step.

Subsequently, in the third step, the particle aggregate in which the wet particles are aggregated is obtained from the clay-like mixture. The clay-like mixture includes the active material particles, the conductive particles, the binder, and the dispersion medium which are uniformly dispersed, and accordingly, the wet particles also include the active material particles, the conductive particles, the binder, and the dispersion medium which are uniformly dispersed. According to the above manufacturing method, therefore, the particle aggregate can be manufactured by the aggregated wet particles including the active material particles and the conductive particles that are uniformly dispersed.

Methods of kneading the primary mixture with the active material particles in the second step may include any one of kneading by use of a batch kneader and kneading by use of a continuous kneader. Further, examples of the kneader may include a single-shaft kneader, a double-shaft kneader, and a multi-shaft kneader having three or more shafts.

As a method of obtaining the wet particles in the third step, examples include obtaining the wet particles by pushing out and cutting the clay-like mixture from fine holes, obtaining the wet particles by cutting laterally and vertically a plate-shaped clay-like mixture, and obtaining the wet particles by extending the clay-like mixture in a bar-like shape and cutting. Further, another example is to round the wet particles obtained by the above methods.

In the above manufacturing method of the particle aggregate, preferably, a bulk density ratio of the active material particles to the conductive particles (the active material particles/the conductive particles) is 15 or more.

In an active material layer of an electrode plate, the conductive particles are placed between the adjacent active material particles to form conductive paths. It has been confirmed that the larger a bulk density of the conductive particles relative to a bulk density of the active material particles is, in other words, the smaller a bulk density ratio of the active material particles relative to the conductive particles (the active material particles/the conductive particles) is, the less the conductivity of the active material layer becomes. Thus, when the bulk density ratio (the active material particles/the conductive particles) is small, increase in a distribution ratio of the conductive particles and decrease in the distribution ratio of the active material particles in the active material layer are essential to ensure the conductivity of the active material layer. The less the distribution ratio of the active material particles in the active material layer becomes, the less an energy density (Wh/kg) in a battery provided with the electrode plate becomes. Therefore, there needs to increase the bulk density ratio (the active material particles/the conductive particles) in order to increase the energy density in manufacturing the battery.

However, it has been found that an electrode plate, which is formed of conventional particle aggregates aggregated by an agitation-type mixer granulator, has difficulty in uniform dispersion of the active material particles and the conductive particles in the formed undried active material film when the conductive particles has very small bulk density relative to the bulk density of the active material particles, especially when the bulk density ratio of the active material particles to the conductive particles (the active material particles/the conductive particles) is 15 or more.

To address this problem, the above manufacturing method of the particle aggregate provides firstly mixing the conductive particles with the binder dispersion in the first step to obtain the primary mixture in which the conductive particles, the binder, and the dispersion medium are uniformly dispersed, and subsequently kneading the primary mixture with the active material particles in the second step as mentioned above. Accordingly, even if the bulk density ratio of the active material particles to the conductive particles (the active material particles/the conductive particles) is large, the active material particles, the conductive particles, the binder, and the dispersion medium can be uniformly dispersed. In other words, even with the large bulk density ratio (the active material particles/the conductive particles), the clay-like mixture in which the active material particles, the conductive particles, the binder, and the dispersion medium are uniformly dispersed can be obtained. In the subsequent third step, the particle aggregate formed of the wet particles in which the active material particles, the conductive particles, the binder, and the dispersion medium are uniformly dispersed can be obtained from this clay-like mixture. Therefore, according to the above manufacturing method, the particle aggregate formed of the aggregated wet particles including the active material particles and the conductive particles that are uniformly dispersed in the wet particles can be manufactured even with the bulk density ratio (the active material particles/the conductive particles) of 15 or more.

The "bulk density" is measured by the following method. Specifically, a bottomed cylindrical container with an inside radius of 50.5 mm and a height of 50 mm is prepared, and a powder (the active material particles or the conductive particles) is calmly put in this container until the container gets entirely full with the powder. Subsequently, excessive powder over an upper surface of the container is removed so that the upper surface of the container becomes flush with the powder filled in the container. A weight (g) of the powder in the container is then measured and divided by a volume ($cm^3$) of the container to obtain the bulk density ($g/cm^3$) of the powder.

Herein, "the bulk density ratio of the active material particles to the conductive particles (the active material particles/the conductive particles)" represents a ratio of the bulk density of the active material particles relative to the bulk density of the conductive particles.

In the manufacturing method of the particle aggregate according to any one of the above aspects, preferably, a bulk density of the conductive particles is 0.08 $g/cm^3$ or less.

When the bulk density of the conductive particles is small, especially when the bulk density is 0.08 $g/cm^3$ or less, the wet particles are hard to be formed of uniformly dispersed active material particles and conductive particles. To address this problem, in the above manufacturing method of the particle aggregate, the conductive particles and the binder dispersion are firstly mixed in the first step to obtain the primary mixture in which the conductive particles, the binder, and the dispersion medium are uniformly dispersed, and the primary mixture and the active material particles are subsequently kneaded in the second step. Accordingly, the active material particles, the conductive particles, the binder, and the dispersion medium can be uniformly dispersed even with the small bulk density of the conductive particles. This leads to obtention of the clay-like mixture in which the active material particles, the conductive particles, the binder, and the dispersion medium are uniformly dispersed even with the small bulk density of the conductive particles. Thereafter, in the third step, the particle aggregate formed of the wet particles including the active material particles, the conductive particles, the binder, and the dispersion medium that are uniformly dispersed can be obtained from this clay-like mixture. According to the above manufacturing method, therefore, the particle aggregate formed of the aggregated wet particles including the active material particles and the conductive particles that are uniformly dispersed can be manufactured even if the bulk density of the conductive particles is 0.08 g/cm$^3$ or less.

In the manufacturing method of the particle aggregate according to any one of the above aspects, preferably, the third step includes granulating the columnar wet particles by pushing out and cutting the clay-like mixture from a push-out hole of an extruder.

When the particle aggregate is manufactured by an agitation-type mixer granulator, the wet particles have highly large particle-size variation. With such large particle-size variation of the wet particles, when the undried active material film is to be formed by the above-mentioned roller press machine, the wet particles with large diameter are not appropriately rolled in the first roller gap between the first roller and the second roller but instead got stuck in the first roller gap. This causes streak-like defects on the undried active material film to be formed on the second roller, and thus the undried active material film that is further to be transferred on the current collecting foil is also made to have the streak-like defects.

In the above manufacturing method of the particle aggregate, on the other hand, the clay-like mixture is pushed out from the push-out hole of the extruder and cut into columnar-shaped wet particles in the third step, and thus the wet particles are formed with less particle-size variation compared to the conventional wet particles manufactured by the agitation-type mixer granulator. Accordingly, the present method achieves prevention of the wet particles from getting stuck in the first roller gap between the first roller and the second roller when the undried active material film is to be manufactured by the above roller press machine, so that the undried active material film to be formed on the second roller and the undried active material film to be transferred on the current collecting foil are both prevented from occurrence of the streak-like defects.

In the above manufacturing method of the particle aggregate, preferably, the third step includes granulating the wet particles each having a columnar shape with a diameter and a height 0.5 to 2.0 times as long as the diameter.

In the above manufacturing method of the particle aggregate, the wet particles are each formed to have a columnar shape with a diameter and a height 0.5 to 2.0 times as long as the diameter. The thus formed wet particles have less particle-size variation than the conventional wet particles manufactured by the agitation-type mixer granulator. Further, each of the wet particles has the height not too short and not too long with respect to the diameter, and thus the wet particles are further prevented from getting stuck in the first roller gap between the first roller and the second roller when the undried active material film is formed by the above-mentioned roller press machine. Accordingly, the undried active material film formed on the second roller and the undried active material film transferred on the current collecting foil are further prevented from occurrence of the streak-like defects.

In the manufacturing method of the particle aggregate according to any one of the above aspects, preferably, the first step and the second step are successively performed to continuously produce the clay-like mixture.

In the above manufacturing method of the particle aggregate, the first step and the second step are successively performed to continuously produce the clay-like mixture, thus producing the clay-like mixture with high efficiency.

In the above manufacturing method of the particle aggregate, preferably, the first step includes mixing the conductive particles with the binder dispersion by use of a double-shaft kneader to form the primary mixture, and the second step includes adding and kneading the active material particles with the primary mixture in the double-shaft kneader to form the clay-like mixture.

In the above manufacturing method of the particle aggregate, the double-shaft kneader is used to mix the conductive particles and the binder dispersion to form the primary mixture in the first step, and accordingly, the primary mixture can be easily and continuously formed. Further, in the second step, the active material particles are added and kneaded to the primary mixture in this double-shaft kneader to form the clay-like mixture. Thus, the second step can be successively performed after the first step and the clay-like mixture is easily and continuously formed.

In the manufacturing method of the particle aggregate according to any one of the above aspects, preferably, the third step is performed successively after the second step to continuously produce the particle aggregate in which the wet particles are aggregated.

In the above manufacturing method of the particle aggregate, the third step is performed successively after the second step, and thus the particle aggregate can be continuously produced by successively performing the first step, the second step, and the third step. Accordingly, the particle aggregate can be efficiently produced.

In the above manufacturing method of the particle aggregate, preferably, the first step, the second step, and the third step are successively performed by use of the double-shaft kneader and an extruder placed downstream of the double-shaft kneader, wherein the first step includes mixing the conductive particles with the binder dispersion by use of the double-shaft kneader to form the primary mixture, the second step includes adding and kneading the active material particles with the primary mixture in the double-shaft kneader to form the clay-like mixture, and the third step includes pushing out and cutting the clay-like mixture from a push-out hole of the extruder to granulate the columnar wet particles.

In the above manufacturing method of the particle aggregate, the first step, the second step, and the third step are successively performed by use of the double-shaft kneader and the extruder placed downstream of this double-shaft kneader, and thus the particle aggregate can be easily and continuously produced.

Another aspect of the present disclosure is a manufacturing method of an electrode plate comprising a current collecting foil and an active material layer including active material particles, conductive particles, and binder, wherein the method includes: a particle aggregate manufacturing process of forming a particle aggregate formed of aggregated wet particles including the active material particles, the conductive particles, the binder, and the dispersion medium according to the manufacturing method of the particle aggregate of any one of the above aspects, an undried film formation process of forming an undried active material film on the current collecting foil by rolling the particle aggregate, and a drying process of drying the undried active material film on the current collecting foil to form the active material layer.

In the above manufacturing method of the electrode plate, the particle aggregate is formed by the above-mentioned manufacturing method of the particle aggregate in the particle aggregate manufacturing process. This particle aggregate is therefore made of the wet particles in which the active material particles and the conductive particles are uniformly dispersed. Accordingly, in the undried film formation process, the undried active material film including the active material particles and the conductive particles that are uniformly dispersed can be produced. Further, in the drying process, the active material layer including the active material particles and the conductive particles that are uniformly dispersed can be obtained.

In the above manufacturing method of the electrode plate, preferably, the particle aggregate manufacturing process, the undried film formation process, and the drying process are successively performed to continuously produce the active material layers.

In the above manufacturing method of the electrode plate, the particle aggregate manufacturing process, the undried film formation process, and the drying process are successively performed to continuously form the active material layers, and thus the electrode plates can be efficiently produced.

In the above manufacturing method of the electrode plate, preferably, the undried film formation process includes: a film formation step of passing and rolling the particle aggregate through a first roller gap between a first roller and a second roller placed in parallel to the first roller to form the undried active material film formed on the second roller; and a transfer step of transferring the undried active material film rolled on the second roller on to the current collecting foil, which has passed through a second roller gap between the second roller and a third roller placed in parallel to the second roller.

In the above manufacturing method of the electrode plate, the undried film formation process includes the above film formation step and the transfer step, and the undried active material film is formed on the current collecting foil by performing these steps. Accordingly, the undried active material film can be easily formed on the current collecting foil, and further, an undried electrode plate having the undried active material film placed on the current collecting foil can be continuously produced.

Another aspect of the present disclosure is a particle aggregate in which wet particles including active material particles, conductive particles, binder, and a dispersion medium are aggregated, wherein the wet particles are formed of a clay-like mixture, and the particle aggregate has a shear pressure of 0.3 MPa or less in a ductility test of pressing the particle aggregate with a pressure of 2.0 MPa and measuring a shear stress required for displacing the particle aggregate by 1.0 mm in an orthogonal direction perpendicular to a pressing direction.

In the above particle aggregate, the wet particles are formed of the clay-like mixture, and the particle aggregate has the shear stress of 0.3 MPa or less in the above-mentioned ductility test. In the wet particles included in this particle aggregate having good ductility, it has been confirmed that the active material particles and the conductive particles are more uniformly dispersed than the conventional particle aggregate formed by the agitation-type mixer granulator. Accordingly, when the particle aggregate having the above characteristics is rolled and transferred on the current collecting foil to form the electrode plate, the undried active material film formed on the current collecting foil and the active material layer formed by drying the undried active material film can achieve uniform dispersion of the active material particles and the conductive particles.

The "ductility test" is performed by the following method. Specifically, the particle aggregate is held between a first bottomed cylindrical container and a second bottomed cylindrical container and pressed with pressure of 2.0 MPa in an axial direction (a pressing direction) of the first container and the second container. Under this pressed state, the second container is moved in a direction orthogonal to the pressing direction, and then a shear stress required to displace the second container by 1.0 mm in the orthogonal direction is measured.

In the above particle aggregate, preferably, a bulk density ratio of the active material particles to the conductive particles (the active material particles/the conductive particles) is 15 or more.

In the above particle aggregate, as mentioned above, the wet particles are made of the clay-like mixture and the particle aggregate has the shear stress of 0.3 MPa or less in the ductility test. Thus, the active material particles and the conductive particles are uniformly dispersed even if the bulk density ratio of the active material particles to the conductive particles (the active material particles/the conductive particles) is 15 or more. Accordingly, formation of the electrode plate from this particle aggregate can achieve uniform dispersion of the active material particles and the conductive particles in the undried active material film formed on the current collecting foil and also achieve uniform dispersion of the active material layer in which the undried active material film has been dried.

In the particle aggregate according to any one of the above aspects, preferably, a bulk density of the conductive particles is 0.08 g/cm$^3$ or less.

In the above particle aggregate, as mentioned above, the wet particles are made of the clay-like mixture and the particle aggregate has the shear stress of 0.3 MPa or less in the ductility test. Thus, the active material particles and the conductive particles are uniformly dispersed even if the bulk density of the conductive particles is 0.08 g/cm$^3$ or less. Accordingly, formation of the electrode plate from this particle aggregate can achieve uniform dispersion of the active material particles and the conductive particles in the undried active material film and the active material layer on the current collecting foil.

In the particle aggregate according to any one of the above aspects, preferably, each of the columnar wet particles has a diameter and a height 0.5 to 2.0 times as long as the diameter.

The above particle aggregate is an aggregate formed of the aggregated columnar wet particles each having a diameter and a height 0.5 to 2.0 times as long as the diameter, and this aggregate has less particle-size variation than the conventional wet particles formed by the agitation-type mixer granulator. Further, each of the wet particles has the height that is not too short and not too long with respect to the diameter, and thus, the wet particles can be prevented from getting stuck in the first roller gap between the first roller and the second roller when the undried active material film is formed by use of the above-mentioned roller press machine. Accordingly, the undried active material film formed on the second roller and the undried active material film transferred on the current collecting foil can be prevented from occurrence of the streak-like defects.

DETAILED DESCRIPTION OF THE EXEMPLARY EMBODIMENTS

Figure 1:
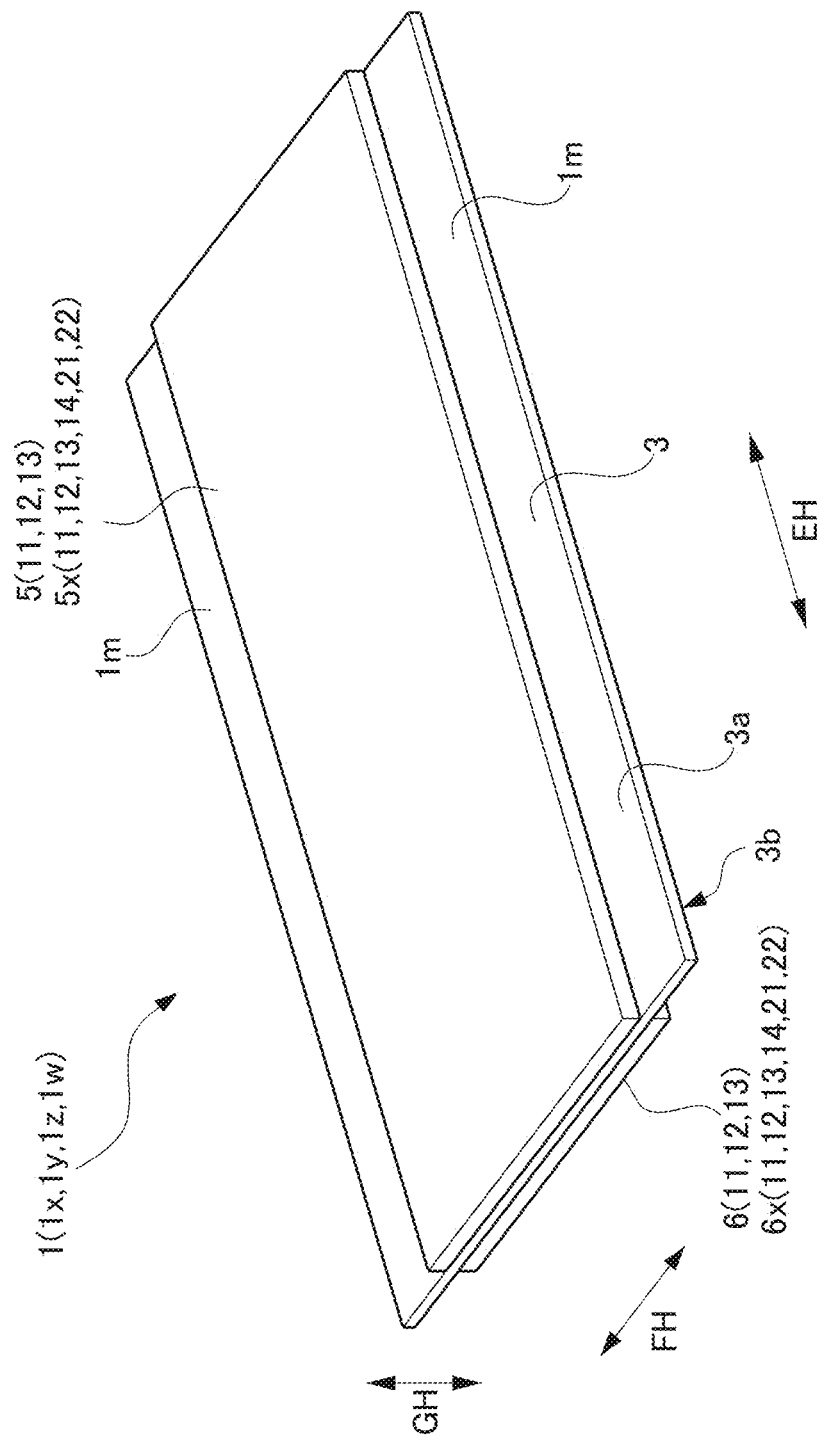
FIG. 1 is a perspective view of a positive electrode plate in an embodiment.

An embodiment of the present disclosure is explained in detail below with reference to the accompanying drawings. FIG. 1 is a perspective view of a positive electrode plate (an electrode plate) 1 according to the present embodiment. In the following explanation, a longitudinal direction EH, a width direction FH, and a thickness direction GH of the positive electrode plate 1 are each defined as directions indicated in FIG. 1. This positive electrode plate 1 is a strip-shaped positive electrode plate used for manufacturing a sealed parallel-piped lithium ion secondary battery mounted in a vehicle such as a hybrid vehicle, a plug-in hybrid vehicle, and an electric vehicle, and particularly, a strip-shaped positive electrode plate used for manufacturing a flat wound electrode body.

The positive electrode plate 1 includes a current collecting foil 3 made of a strip-shaped aluminum foil extending in the longitudinal direction EH. A central part of a first primary surface 3a of the current collecting foil 3 extending in the width direction FH and the longitudinal direction EH is formed with a strip-shaped first active material layer 5. Further, in a center region extending in the width direction FH and the longitudinal direction EH of a second primary surface 3b on the other side of the current collecting foil 3 opposite to the first primary surface 3a, a strip-shaped second active material layer 6 is formed. No first active material layer 5 and no second active material layer 6 are provided in the thickness direction GH on both ends in the width direction FH of the positive electrode plate 1, and thus each of the ends has an exposed portion 1m in which the current collecting foil 3 is exposed in the thickness direction GH.

The first active material layer 5 and the second active material layer 6 are each configured with active material particles 11, conductive particles 12, and binder 13. Each weight of the active material particles 11, the conductive particles 12, and the binder 13 is represented at a ratio of 94.5:4.0:1.5.

Further, in the present embodiment, the active material particles 11 are positive active material particles in which lithium ions are inserted and removed, specifically, lithium nickel manganese cobalt oxide particles as one example of lithium transition metal composite oxide particles. Each of the active material particles has a mean particle diameter of 6 μm and a bulk density of 1.12 g/cm$^3$.

The conductive particles 12 are carbon-based conductive particles made of carbon-based material, specifically, acetylene black (AB) particles. The mean particle diameter of the conductive particles 12 is 0.03 μm, and the bulk density is 0.08 g/cm$^3$ or less (in the present embodiment, 0.06 g/cm$^3$). Accordingly, a bulk density ratio of the active material particles 11 to the conductive particles 12 (the active material particles/the conductive particles) is 15 or more (in the present embodiment, 1.12/0.06=18.7). The thus large bulk density ratio (the active material particles/the conductive particles), or in other words, the small bulk density of the conductive particles 12 relative to the bulk density of the active material particles 11 achieves reduction in a compounding ratio of the conductive particles 12 necessary for ensuring conductivity of the first active material layers 5 and the second active material layers 6 (in the present embodiment, 4.0 wt %) and further achieves increase in the compounding ratio of the active material particles 11 (in the present embodiment, 94.5 wt %).

Further, the binder 13 is polyvinylidene fluoride (PVDF).

Figure 2:
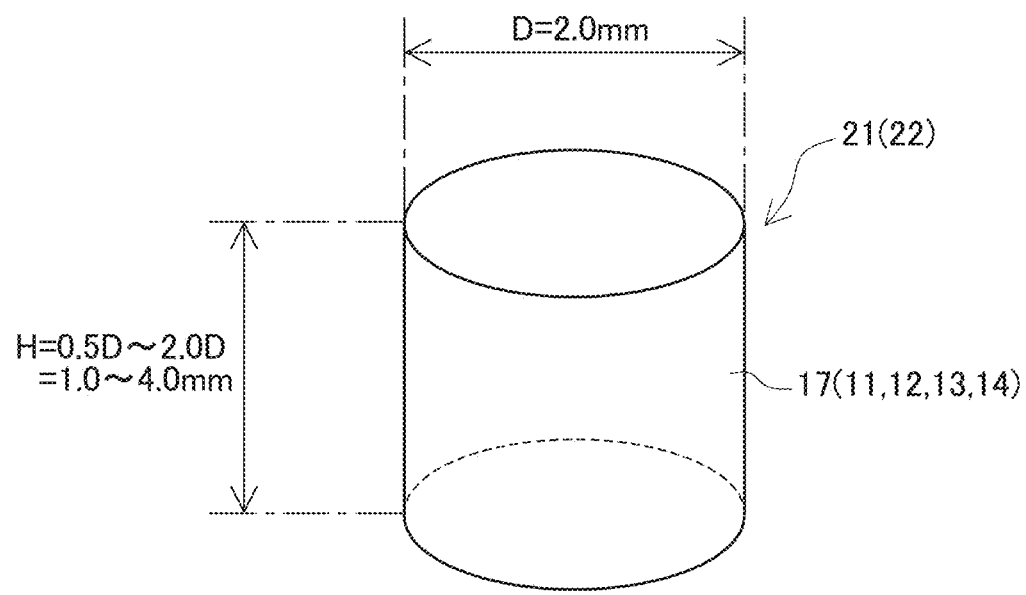
FIG. 2 is a perspective view of a wet particle in the embodiment.

The above-mentioned first active material layer 5 and the second active material layer 6 are, as it will be explained below, each formed of a particle aggregate in which wet particles 21 (see FIG. 2) are aggregated. Each of the wet particles 21 is of a columnar shape with a diameter D (in the present embodiment, D=2.0 mm) and a height H=0.5D to 2.0D (in the present embodiment, H=D=2.0 mm). Further, the wet particles 21 are made of clay-like mixture which is formed of the active material particles 11, the conductive particles 12, the binder 13, and a dispersion medium 14. Accordingly, the bulk density ratio (the active material particles/the conductive particles) of the active material particles 11 to the conductive particles 11 which are used for the wet particles 21 is 15 or more (in the present embodiment, 18.7), and the bulk density of the conductive particles 12 is 0.08 g/cm$^3$ or less (in the present embodiment, 0.06 g/cm$^3$).

Figure 5:
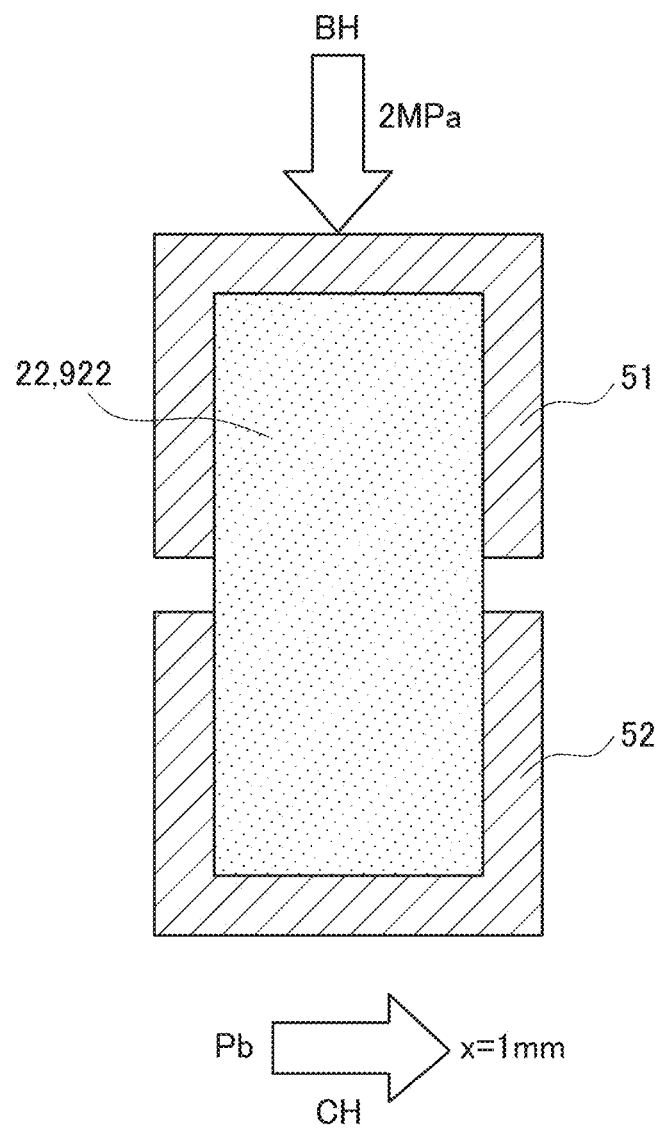
FIG. 5 is an explanatory view of a ductility test performed for a particle aggregate.

The particle aggregate 22 has a shear stress Pb of 0.3 MPa or less (to be specific, about 0.1 MPa) in a ductility test (see FIG. 5). This ductility test is carried out such that the particle aggregate is held between a bottomed cylindrical first container 51 and a bottomed cylindrical second container 52 and then pressed at a pressure of 2.0 MPa in an axial direction of the first container 51 and the second container 52 (in a pressing direction BH indicated as an up and down direction in FIG. 5). Under this pressed state, the second container 52 is moved to an orthogonal direction CH (in a rightward direction in FIG. 5) perpendicular to the pressing direction BH. Subsequently, the shear stress Pb (MPa) necessary for displacing the second container 52 in the orthogonal direction CH by x=1.0 mm is measured. The pressure (2.0 MPa) applied in the above pressing direction BH has been determined based on the pressing pressure subjected to the particle aggregate 22 by a first roller 210 and a second roller 220 when an undried active material film (a first undried active material film 5x or a second undried active material film 6x) is formed from the particle aggregate 22 by use of a roller press machine 200 (see FIG. 13) which will be explained below.

Figure 6:
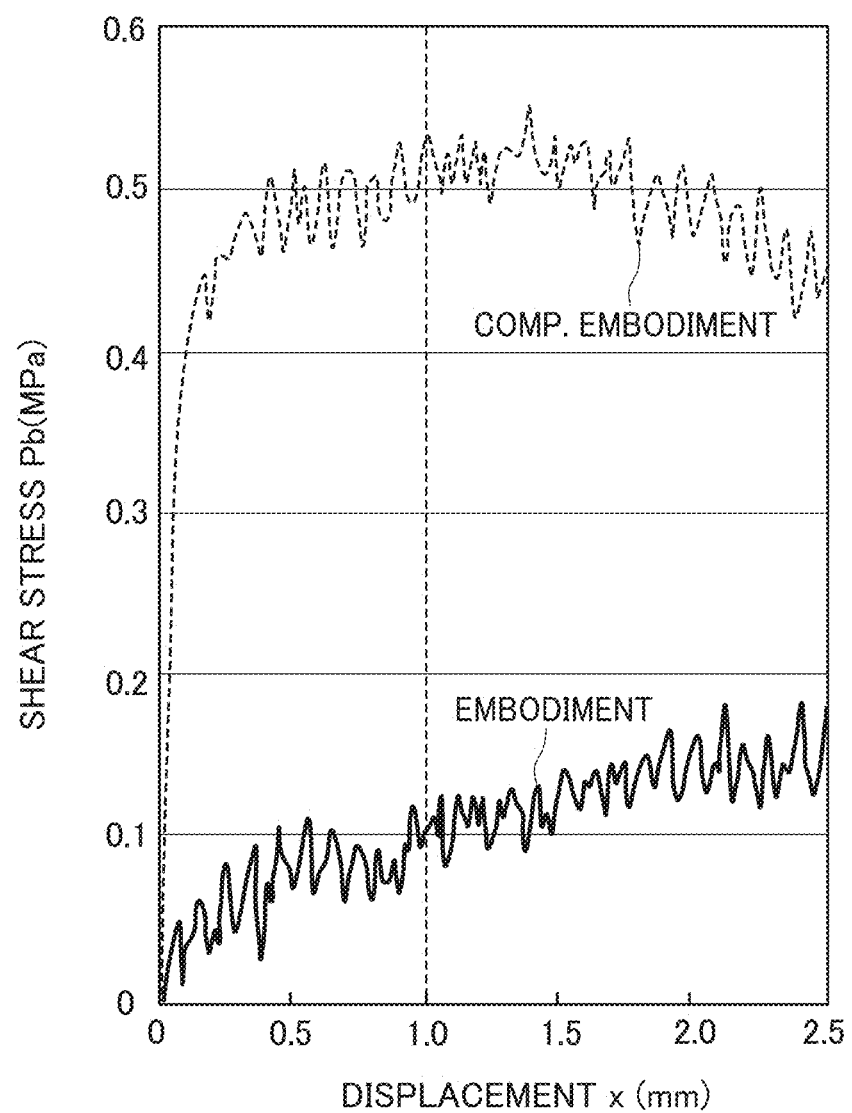
FIG. 6 is a graph showing a relationship between a displacement and a shear stress of particle aggregates of the embodiment and a comparative embodiment according to the ductility test.

FIG. 6 is a graph showing a relationship of a displacement amount x (mm) and the shear stress Pb (MPa) in the ductility test. As clear from FIG. 6, the particle aggregate 22 of the present embodiment has the shear stress Pb of about 0.1 MPa required for displacing the second container 52 by the displacement amount x=1.0 mm in the orthogonal direction CH in the ductility test.

On the other hand, a conventional particle aggregate 922 (hereinafter, also referred as a particle aggregate 922 of a comparative embodiment) is formed by concurrently mixing the active material particles 11, the conductive particles 12, and a binder dispersion 15 in which the binder 13 is dispersed in the dispersion medium 14 by use of an agitation-type mixer granulator. This conventional particle aggregate 922 is similarly held the ductility test and the test result shows that the shear stress Pb of 0.5 MPa is required to displace the second container 52 by x=1.0 mm in the orthogonal direction CH (see FIG. 6). Accordingly, the particle aggregate 22 of the present embodiment has the shear stress Pb in the ductility test greatly smaller than that of the particle aggregate 922 in the comparative embodiment. The particle aggregate 22 with this excellent ductility has less variation in the ratio of the binder dispersion 15 included in the wet particles as explained below, and the active material particles 11 and the conductive particles 12 are uniformly dispersed in the wet particles 21.

Figure 3:
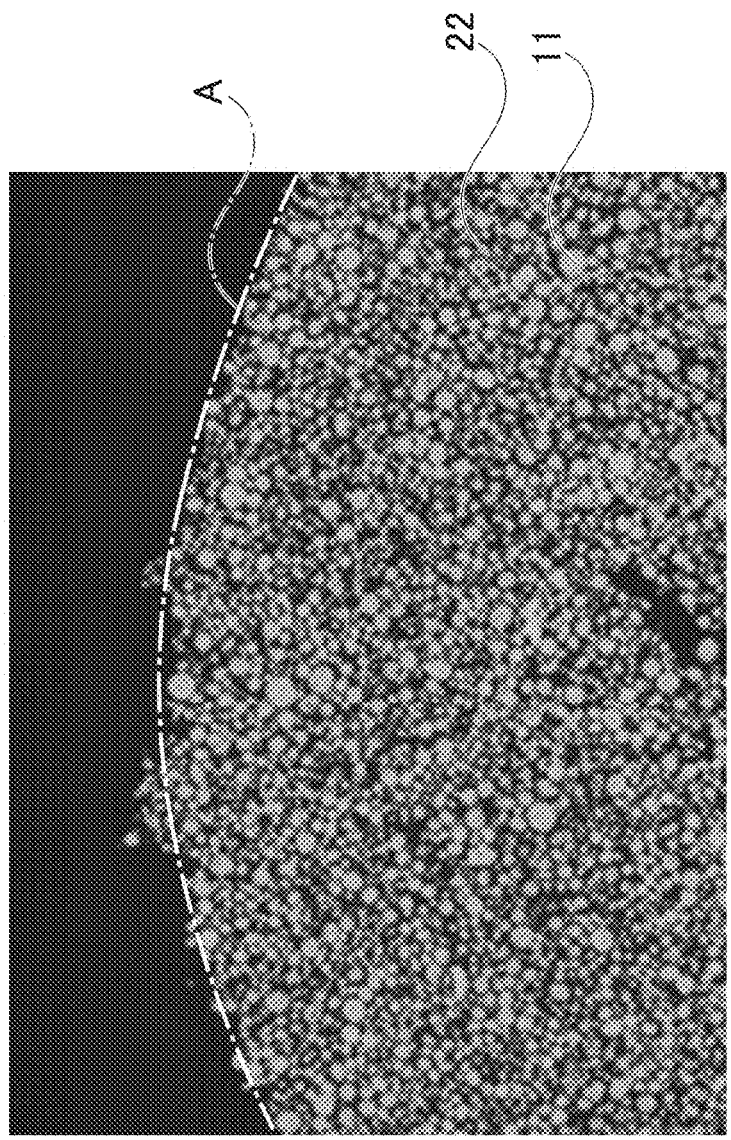
FIG. 3 is an SEM image of the wet particle in the embodiment.
Figure 4:
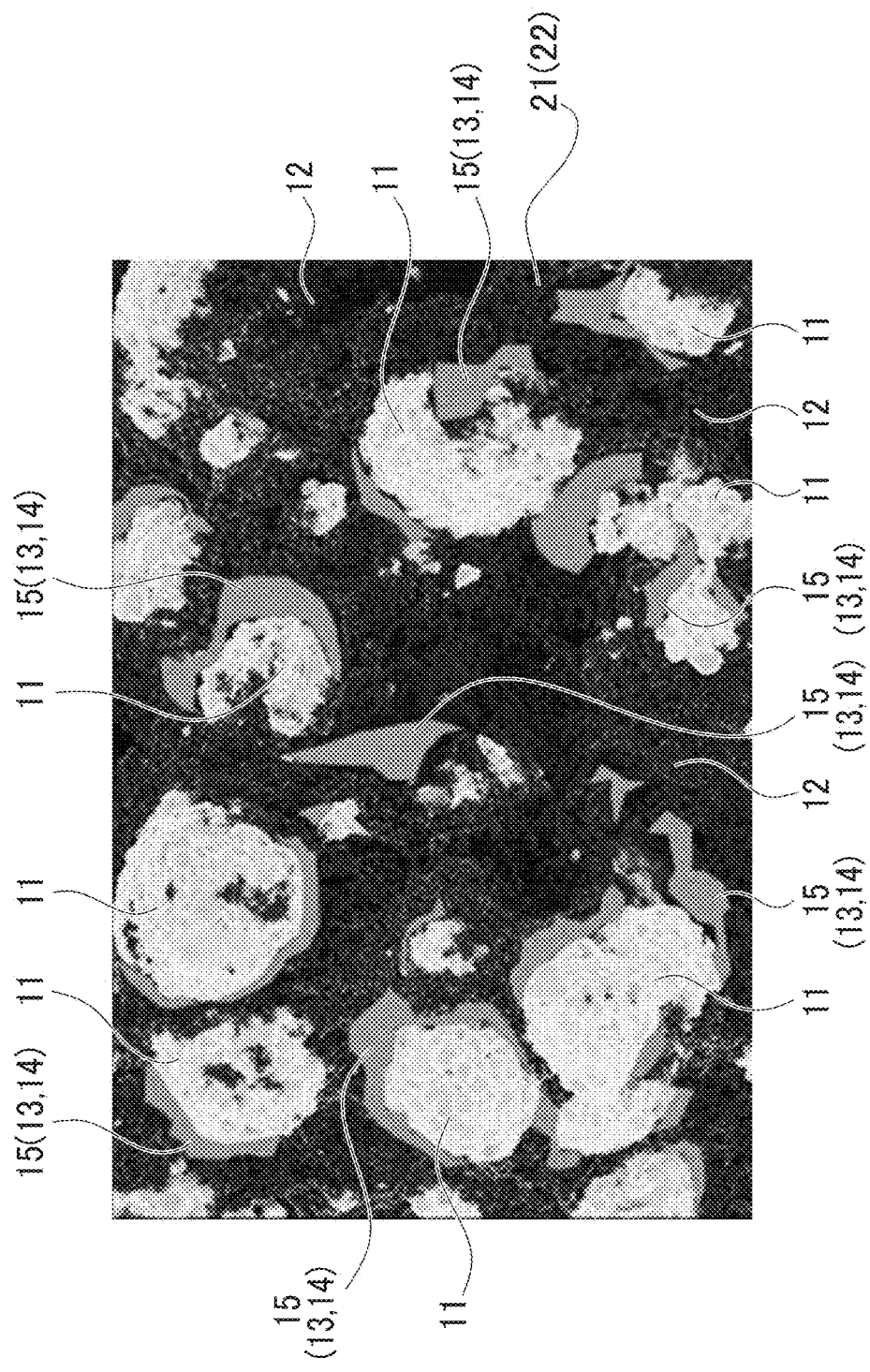
FIG. 4 is a partly enlarged view of the SEM image of the wet particle in FIG. 3.

FIG. 3 is an SEM image of a part of the wet particle 21 in the present embodiment. FIG. 4 is a partly enlarged SEM image of the wet particle 21 in FIG. 3. A dashed line A indicated in FIG. 3 represents a cylindrical particle surface of the wet particle 21. In FIGS. 3 and 4, granular white large particles represent the active material particles 11. The large number of the conductive particles 12 exist in a space between the adjacent active material particles 11 (in FIGS. 3 and 4, the conductive particles 12 are represented as black-colored parts).

In FIG. 4, gray parts mainly encircling the active material particles 11 represent the binder dispersion 15 in which the binder 13 is dispersed in the dispersion medium 14. Positions where the binder dispersion 15 exists are specified by Cryo FIB-SEM. Specifically, a measurement sample is placed under an environment of −130° C. to observe an SEM image, and this SEM image is compared to an SEM image of the portion of the measurement sample after the dispersion medium 14 has been sublimated from the measurement sample. Thus, the portion where the binder dispersion 15 exists before sublimation is identified.

Figure 14:
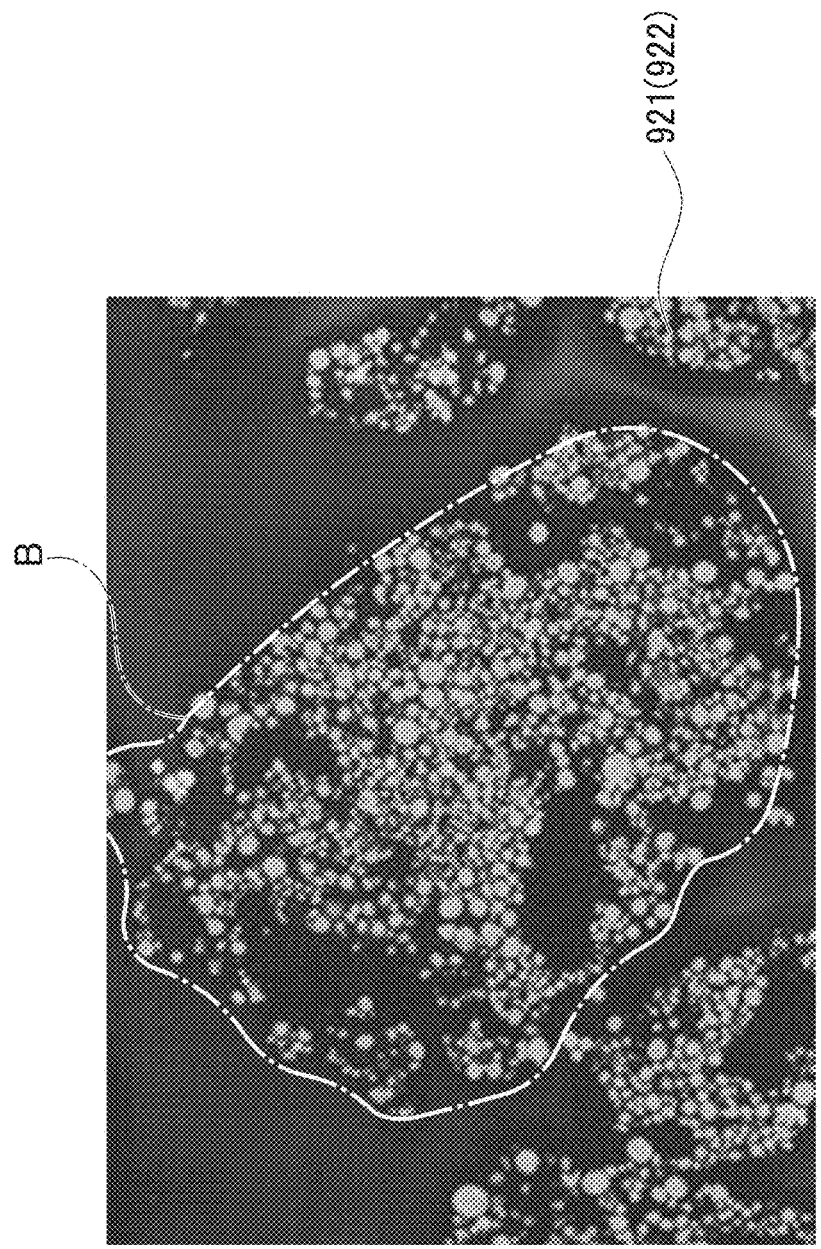
FIG. 14 is an SEM image of wet particles in the comparative embodiment.
Figure 15:
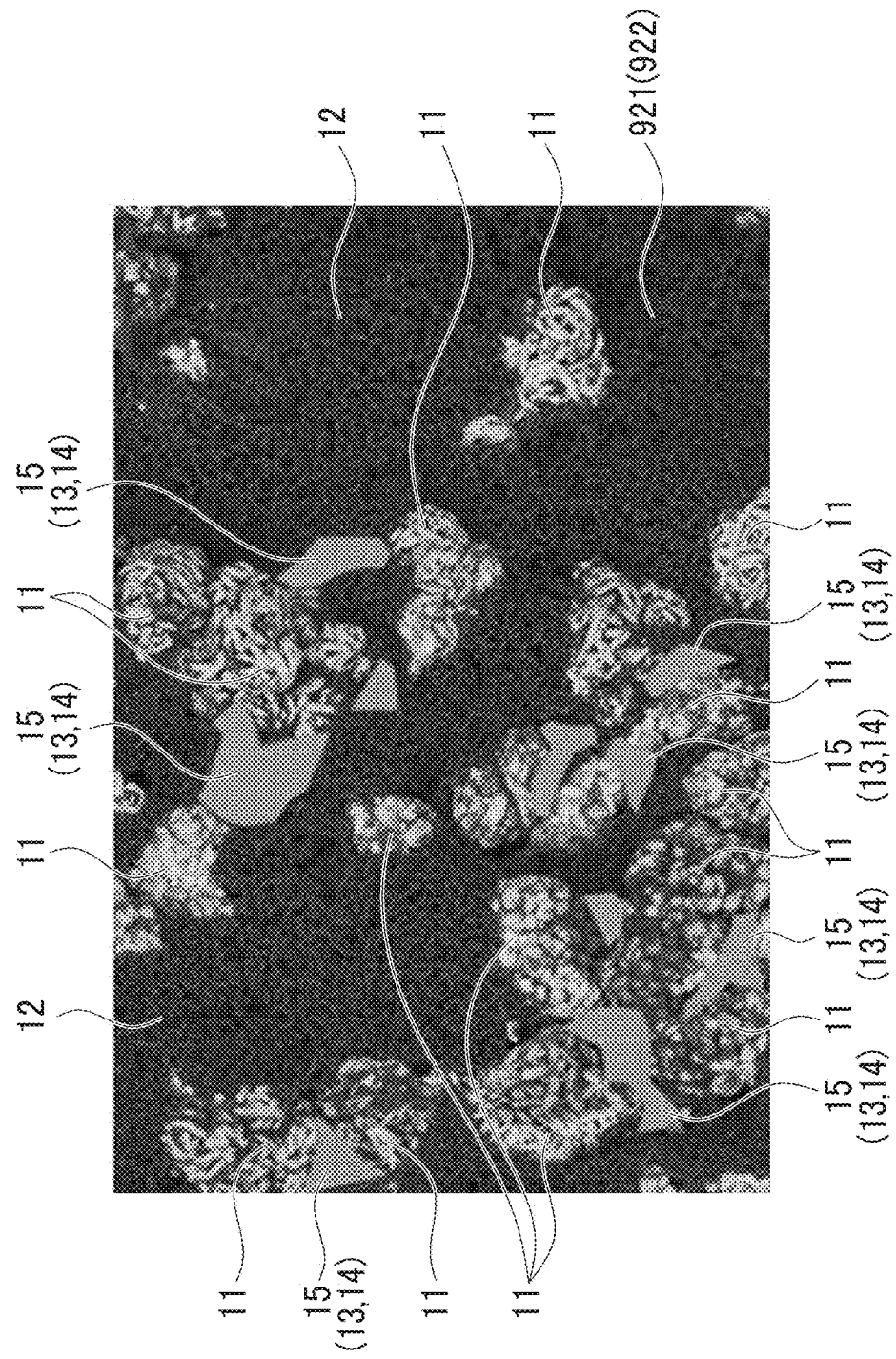
FIG. 15 is a partly enlarged SEM image of the wet particles in FIG. 14.

Further, FIG. 14 and FIG. 15 show SEM images of wet particles 921 of the particle aggregate 922 in the comparative embodiment which has been manufactured by the agitation-type mixer granulator as mentioned above (FIG. 14 is indicated with the same magnification with FIG. 3, and FIG. 15 is indicated with the same magnification with FIG. 4). A dashed line B in FIG. 14 indicates a particle surface of one wet particle 921.

As clear from comparison of FIG. 4 and FIG. 15, the active material particles 11 and the conductive particles 12 are uniformly dispersed in the wet particle 21 of the present embodiment as compared to the wet particle 921 of the comparative embodiment.

The wet particle 21 of the present embodiment includes the binder dispersion 15 encircling the active material particle 11, and thus a contact area of the active material particle 11 and the binder dispersion 15 is made larger than the wet particle 921 of the comparative embodiment. The active material particle 11 of the comparative embodiment which is not encircled by the binder dispersion 15 has large friction with the adjacent active material particle 11, resulting in difficulty in moving inside the wet particle 921. On the other hand, the active material particle 11 of the present embodiment is encircled by the binder dispersion 15 and thus has less friction with the adjacent active material particle 11, resulting in easy movement in the wet particle 21. Accordingly, the particle aggregate 22 of the present embodiment has excellent ductility as compared to the particle aggregate 922 of the comparative embodiment, and thus the shear stress Pb in the above-mentioned ductility test has been confirmed to be drastically reduced. Further, the large number of SEM images of the particle aggregate 22 of the present embodiment and the particle aggregate 922 of the comparative embodiment have been examined, and it is confirmed that the particle aggregate 22 of the present embodiment has less variation in the ratio of the binder dispersion 15 included in the wet particle than the particle aggregate 922 of the comparative embodiment.

Figure 7:
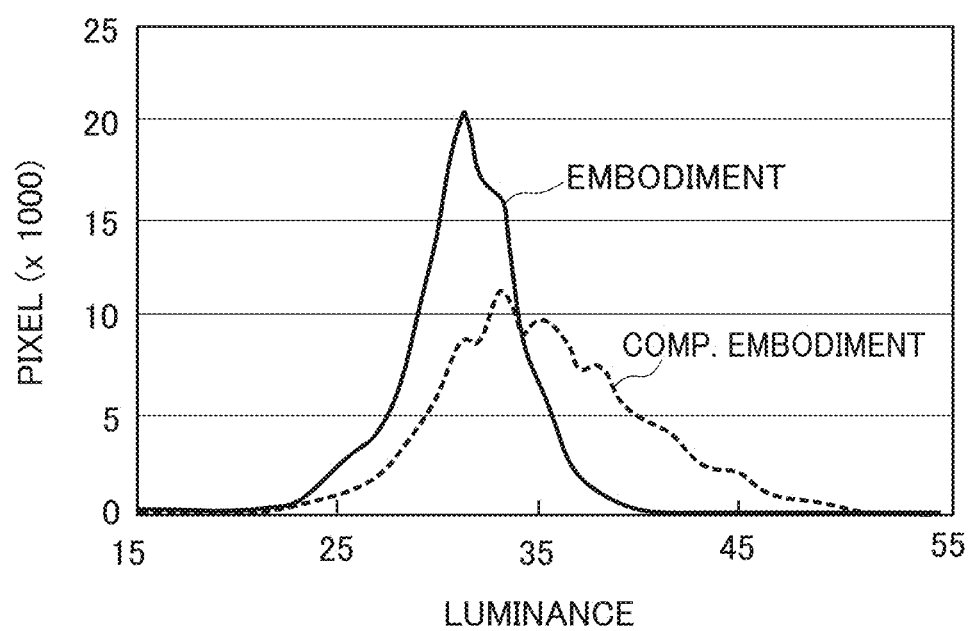
FIG. 7 is a graph showing a relationship between a material color difference (luminance) and pixel numbers of positive electrode plates in the embodiment and the comparative embodiment.
Figure 8:
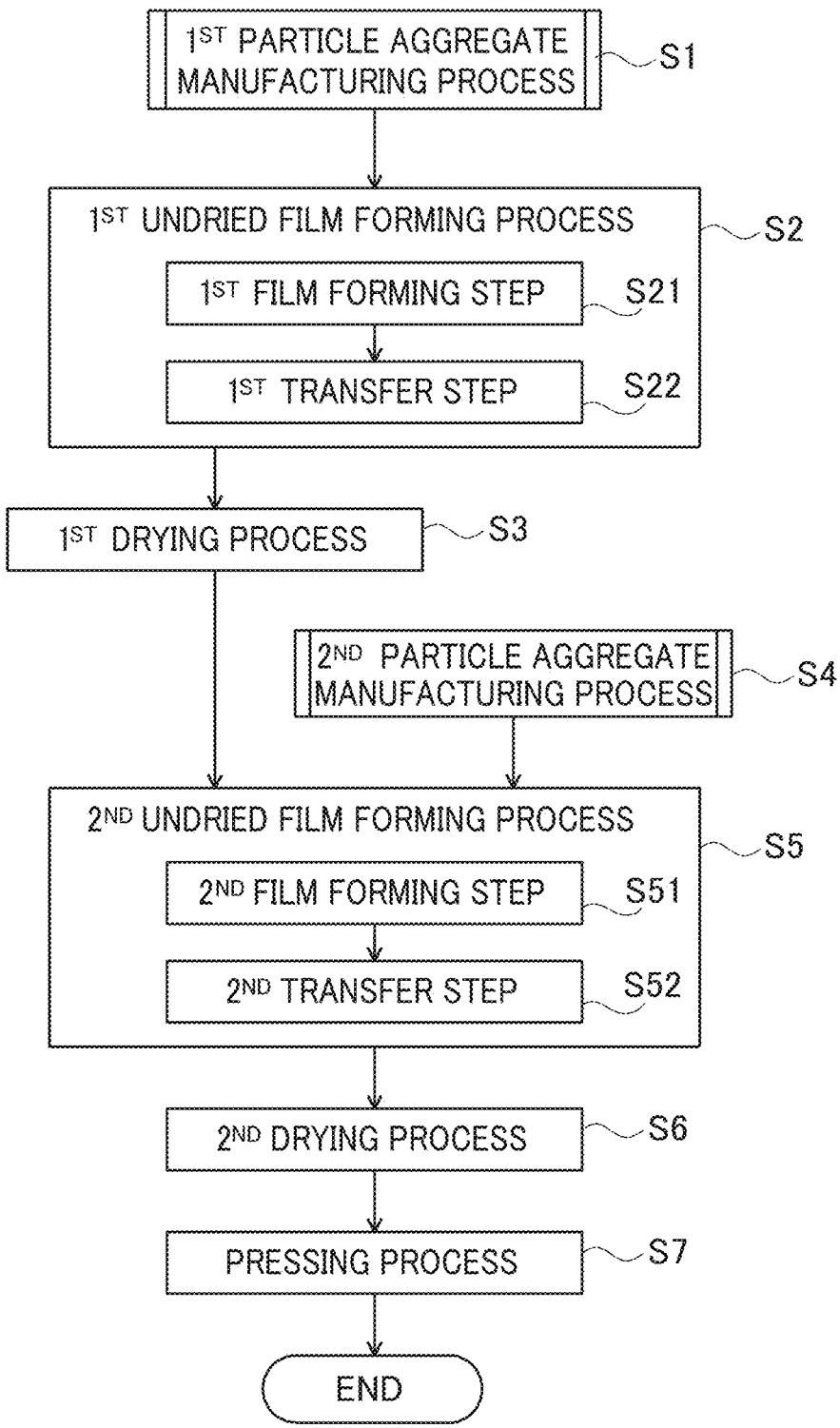
FIG. 8 is a flow chart of a manufacturing method of the positive electrode plate in the embodiment.
Figure 9:
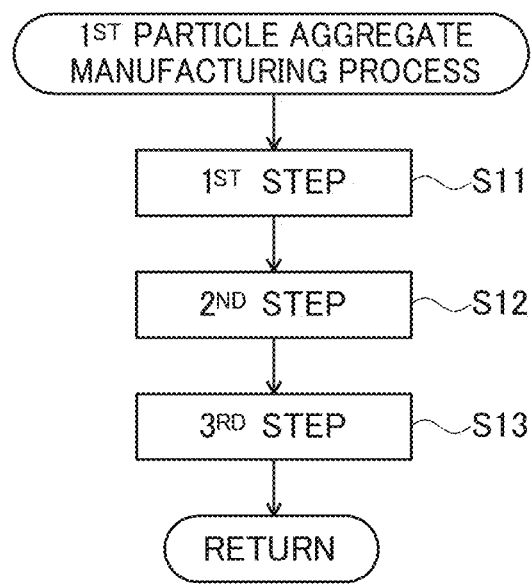
FIG. 9 is a flow chart showing a sub-routine of a first particle aggregate manufacturing process in the embodiment.
Figure 10:
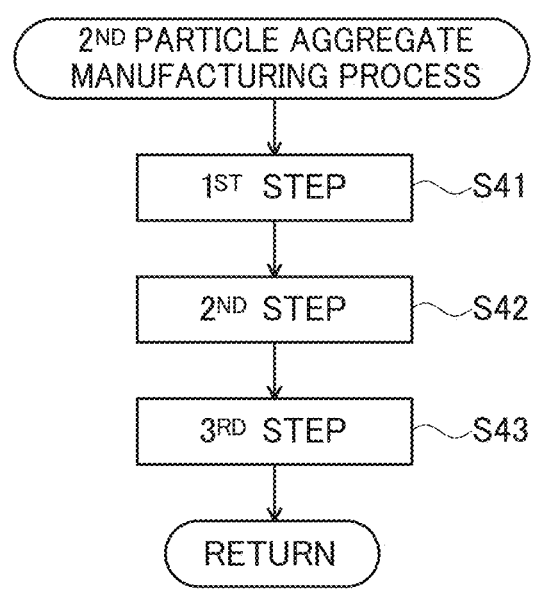
FIG. 10 is a flow chart showing a sub-routine of a second particle aggregate manufacturing process in the embodiment.

Further, dispersibility of the active material particles 11 and the conductive particles 12 in the wet particles 21 is quantitatively assessed by a "luminance analysis test" in addition to an assessment of the above-mentioned SEM image (see FIG. 7). The positive electrode plate 1 is manufactured from the particle aggregate 22 of the present embodiment by a manufacturing method described later, and then, an image of material color difference (luminance) on a surface of the first active material layer 5 of the positive electrode plate 1 is analyzed.

Specifically, the acetylene black particles as the conductive particles 12 are quite low in their reflection rate while the active material particles 11 including nickel and cobalt has high reflection rate. Accordingly, of the surface of the first active material layer 5 of the positive electrode plate 1, a portion where the large number of the conductive particles 12 exist (a portion where the active material particles 11 less exist) is low in the luminance, and a portion where the large number of the active material particles 11 exist (a portion where the conductive particles 12 less exist) is high in the luminance. A photographed image (two-hundred and fifty-thousand pixels in the entire number of pixels) of the surface of the first active material layer 5 of the positive electrode plate 1 is measured its luminance of each pixel. FIG. 7 is a graph showing a frequency distribution of the luminance of the analyzed each pixel. The particle aggregate 922 of the comparative embodiment is similarly analyzed its image.

As clear from the graph in FIG. 7, the positive electrode plate 1 including the particle aggregate 22 of the present embodiment has less luminance variation than a positive electrode plate including the particle aggregate 922 of the comparative embodiment. To be specific, while the positive electrode plate including the particle aggregate 922 of the comparative embodiment has the luminance variation (standard deviation of the luminance) of 5.4, the positive electrode plate 1 including the particle aggregate 22 of the present embodiment has the luminance variation (the standard deviation of the luminance) of 3.0. From this result, the particle aggregate 22 of the present embodiment is conceived to achieve uniform dispersion of the active material particles 11 and the conductive particles 12 in the wet particles 21 as compared to the particle aggregate 922 of the comparative embodiment.

As explained above, the particle aggregate 22 of the present embodiment includes the wet particles 21 formed of the clay-like mixture 17 and has the shear stress Pb of 0.3 MPa or less (in the present embodiment, about 0.1 MPa) in the ductility test. The wet particles 21 included in the particle aggregate 22 having this preferable ductility less vary in their ratio of the binder dispersion 15 included in the wet particles 21 than the wet particles 921 of the conventional particle aggregate 922. Further, the active material particles 11 and the conductive particles 12 are uniformly dispersed in the wet particles 21. Accordingly, when the positive electrode plate 1 is formed by rolling the particle aggregate 22 having this feature and transferring it on the current collecting foil 3 as explained in detail below, an undried active material film (a first undried active material film 5x and a second undried active material film 6x) formed on the current collecting foil 3 and an active material layer (a first active material layer 5 and a second active material layer 6) formed by drying the undried active material film can achieve prevention of the streak-like defects and uniform dispersion of the active material particles 11 and the conductive particles 12.

Further, in the present embodiment, the bulk density ratio of the active material particles 11 to the conductive particles 12 (the active material particles/the conductive particles) is 15 or more (18.7 in the present embodiment), and the bulk density of the conductive particles 12 is 0.08 g/cm$^3$ or less (in the present embodiment, 0.06 g/cm$^3$). Despite the above features, the wet particles 21 are formed of the clay-like mixture 17, and the particle aggregate 22 has the shear stress of 0.3 MPa or less (about 0.1 MPa in the present embodiment) in the ductility test as mentioned above, and therefore, the active material particles 11 and the conductive particles 12 are uniformly dispersed in the wet particles 21.

Further, the particle aggregate 22 of the present embodiment is an aggregate body of the columnar wet particles 21 each having a diameter D and a height H that is 0.5 to 2.0 times as long as the diameter D (the height H is equal to the diameter D in the present embodiment), and thus the particle aggregate 22 has less variation in the particle diameter than the wet particles 921 of the comparative embodiment that is formed by the agitation-type mixer granulator. Each of the wet particles 21 has the height H which is not too short and not too long with respect to the diameter D, and thus the wet particles 21 can be prevented from getting stuck in the first roller gap G1 between the first roller 210 and the second roller 220 when the undried active material film (the first undried active material film 5x and the second undried active material film 6x) is to be formed by the roller press machine 200 described below. As a result of this, the undried active material film (the first undried active material film 5x and the second undried active material film 6x) formed on the second roller 220 and the undried active material film (the first undried active material film 5x and the second undried active material film 6x) transferred on the current collecting foil 3 are prevented from occurrence of the streak-like defects.

A manufacturing method of the particle aggregate 22 and a manufacturing method of the positive electrode plate 1 using the particle aggregate 22 are now explained (see FIGS. 8 to 13). In the present embodiment, first active material layers 5 are continuously formed by successively performing all the steps of "a first particle aggregate manufacturing process S1" to "a first drying process S3", and second active material layers 6 are continuously formed by successively performing all the steps of "a second particle aggregate manufacturing process S4" to "a second drying process S6".

In the "first particle aggregate manufacturing process S1", the particle aggregate 22 in which the wet particles 21 are aggregated is produced. In the present embodiment, each step (a first step S11, a second step S12, and a third step S13) of the first particle aggregate manufacturing process S1 is successively performed to continuously produce the particle aggregate 22.

The "first step S11" (see FIG. 9) of the first particle aggregate manufacturing process S1 (see FIG. 8) is carried out by mixing the conductive particles 12 with the binder dispersion 15 in which the binder 13 is dispersed in the dispersion medium 14 to obtain the first mixture 16. As mentioned above, in the present embodiment, the conductive particles 12 adopt AB particles each having a mean particle diameter of 0.03 μm and a bulk density of 0.08 g/cm$^3$ or less (in the present embodiment, 0.06 g/cm$^3$). Further, the binder 13 adopts PVDF, and the dispersion medium 14 adopts N-methylpyrrolidone (NMP). Furthermore, a weight ratio of the conductive particle 12, the binder 13, and the dispersion medium 14 is determined at a ratio of 4.0:1.5:19.0.

Prior to performing the first step S11, the binder 13 is added to the dispersion medium 14 by a mixer provided with agitation blades and mixed to obtain the viscous binder dispersion 15 in which the binder 13 is uniformly dispersed in the dispersion medium 14. Thereafter, the conductive particles 12 and the binder dispersion 15 are mixed by a double-shaft kneader 100 (see FIG. 11) to obtain the first mixture 16.

Figure 11:
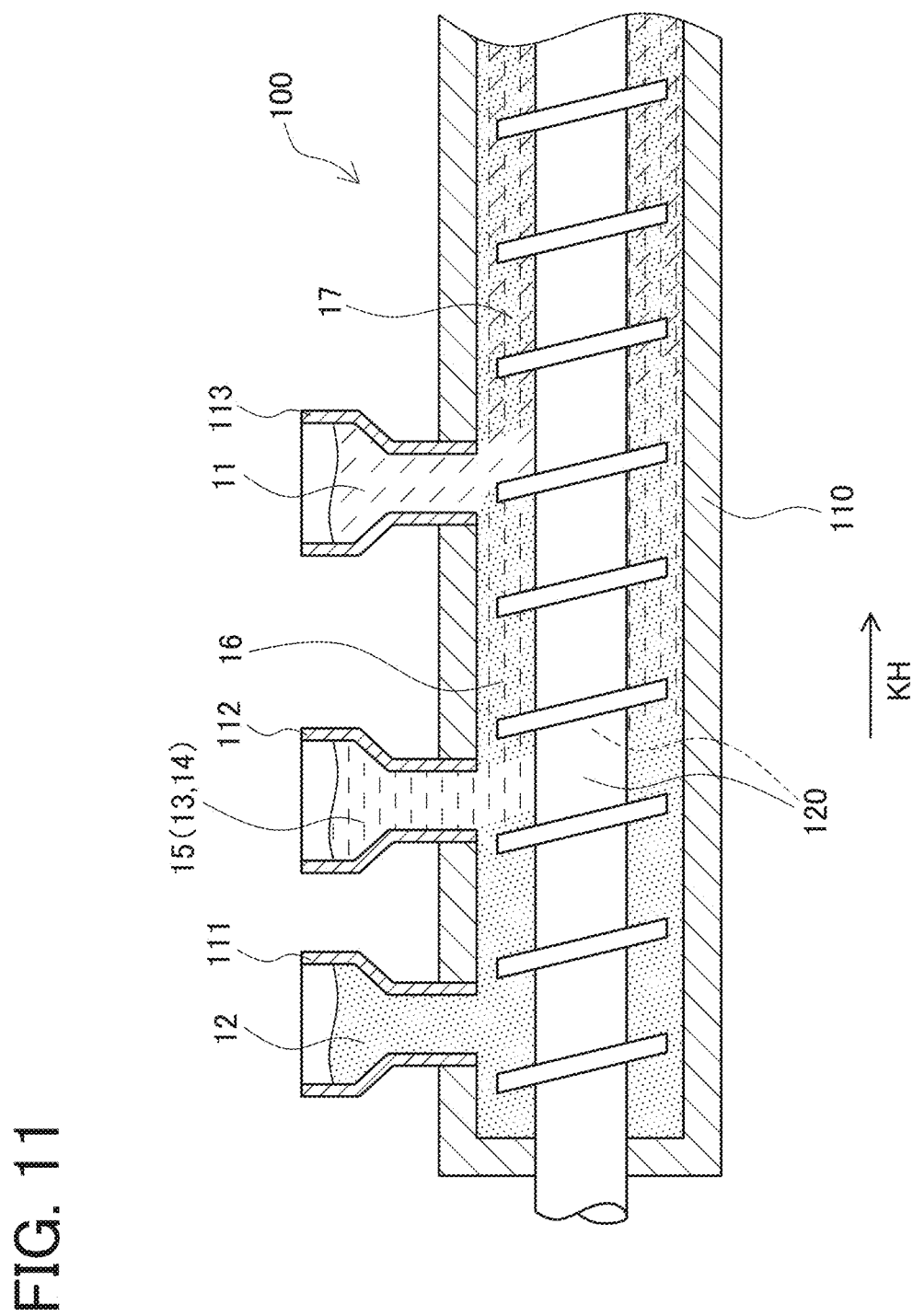
FIG. 11 is an explanatory view showing a way of forming a clay-like mixture by use of a double-shaft kneader according to a manufacturing method of the particle aggregate in the embodiment.

This double-shaft kneader 100 is provided with a kneading cylinder 110 and a pair of kneading screws 120 placed in parallel to each other in the kneading cylinder 110 (in FIG. 11, a pair of the kneading screws 120 are arranged in a direction orthogonal to a paper surface). The kneading cylinder 110 includes three supply parts of a first supply part 111, a second supply part 112, and a third supply part 113 arranged in this order from an upstream side. Into the first supply part 111, the conductive particles 12 are put by a certain amount per unit of time, and the binder dispersion 15 is put into the second supply part 112 by a certain amount per unit of time. Further, into the third supply part 113, the active material particles 11 are put by a certain amount per unit of time.

In the first step S11, the conductive particles 12 are supplied into the kneading cylinder 110 from the first supply part 111. The thus supplied conductive particles 12 are conveyed through the kneading cylinder 110 by a pair of the kneading screws 120 in a kneading direction KH (rightward in FIG. 11). Subsequently, the binder dispersion 15 is supplied into the kneading cylinder 110 from the second supply part 112 downstream of the first supply part 111 (rightward in FIG. 11). The conductive particles 12 and the binder dispersion 15 are mixed by the pair of the kneading screws 120 and moved inside the kneading cylinder 110 in the kneading direction KH, so that the first mixture 16 in which the conductive particles 12, the binder 13, and the dispersion medium 14 are uniformly dispersed is continuously produced.

Subsequently, the "second step S12" is carried out to knead the first mixture 16 with the active material particles 11 to produce the clay-like mixture 17. In the present embodiment, the active material particles 11 are made of lithium nickel manganese cobalt oxide particles having the mean particle diameter of 6 μm and the bulk density of 1.12 g/cm³ as mentioned above. Accordingly, the bulk density ratio of the active material particles 11 to the conductive particles 12 (the active material particles/the conductive particles) is 15 or more (1.12/0.06=18.7 in the present embodiment). Further, the active material particles 11 are prepared such that the weight ratio of the active material particles 11, the conductive particles 12, the binder 13, and the dispersion medium 14 is defined at a ratio of 94.5:4.0:1.5:19.0.

The second step S12 is also performed by use of the above-mentioned double-shaft kneader 100. Specifically, the active material particles 11 are supplied into the kneading cylinder 110 from the third supply part 113 downstream (rightward in FIG. 11) of the second supply part 112. The thus supplied active material particles 11 are kneaded with the first mixture 16 in the kneading cylinder 110 by the pair of the kneading screws 120 and moved in the kneading cylinder 110 in the kneading direction KH. As a result of this, the clay-like mixture 17 formed of the active material particles 11, the conductive particles 12, the binder 13, and the dispersion medium 14 that are uniformly dispersed is continuously produced.

Figure 12:
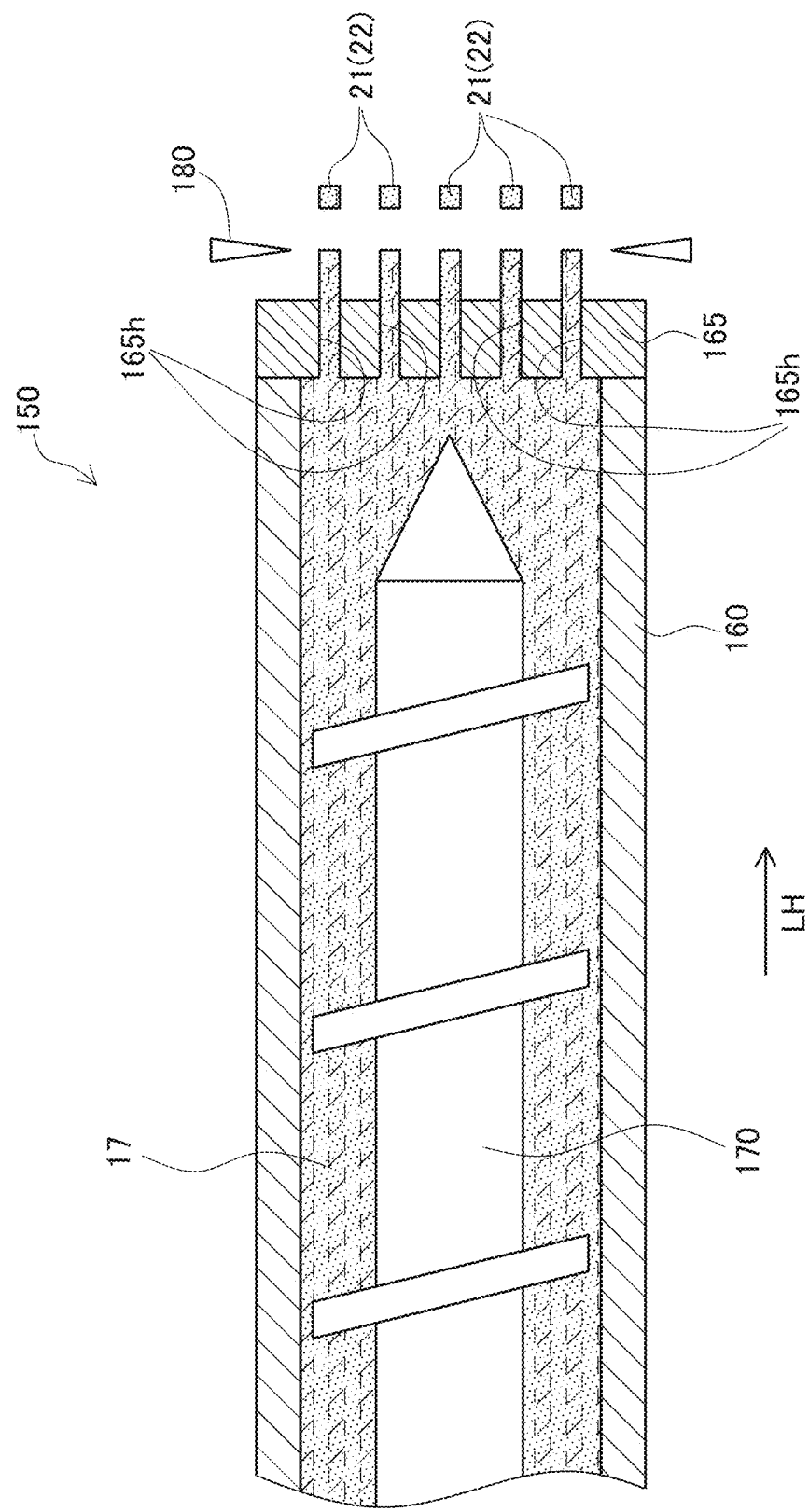
FIG. 12 is an explanatory view showing a way of forming wet particles by use of an extruder according to the manufacturing method of the particle aggregate in the embodiment.

Subsequently, the "third step S13" is carried out to produce the particle aggregate 22 formed of the aggregated wet particles 21 from the clay-like mixture 17 by an extruder 150 (see FIG. 12). The extruder 150 is provided with a push-out cylinder 160, a single push-out screw 170 placed inside the push-out cylinder 160, and cutting blades 180 for cutting the clay-like mixture 17 which has been pushed out from the push-out cylinder 160. The push-out cylinder 160 is connected to the kneading cylinder 110 of the above-mentioned double-shaft kneader 100 and configured such that the clay-like mixture 17 formed in the double-shaft kneader 100 is fed out to the push-out cylinder 160 of the extruder 150 from the kneading cylinder 110 of the double-shaft kneader 100. Further, on a leading end portion 165 (rightward in FIG. 12) of the push-out cylinder 160, a plurality of push-out holes 165h to push the clay-like mixture 17 to outside (rightward in FIG. 12) are provided.

In this third step S13, the clay-like mixture 17 formed in the second step S12 is moved in a push-out direction LH (rightward in FIG. 12) inside the push-out cylinder 160 by the push-out screw 170, and then pushed outside through the push-out holes 165h on the leading end portion 165 of the push-out cylinder 160. The thus pushed out clay-like mixture 17 is then cut by the cutting blades 180. The columnar shaped wet particles 21 are thus granulated with a diameter D (D=2.0 mm in the present embodiment) and a height H which is 0.5 to 2.0 times as long as the diameter D (H=D=2.0 mm in the present embodiment). Accordingly, the particle aggregate 22 in which the wet particles 21 are aggregated is continuously produced.

Subsequently, in "a first undried film formation process S2" (see FIGS. 8 and 13), the first undried active material film 5x formed of the rolled particle aggregate 22 is formed on the current collecting foil 3. This first undried film formation process S2 is performed by use of the roller press machine 200. This roller press machine 200 includes three rollers of a first roller 210, a second roller 220 placed in parallel with the first roller 210 via a first roller gap G1, and a third roller 230 placed in parallel with the second roller 220 via a second roller gap G2. The first roller 210, the second roller 220, and the third roller 230 are each connected with a motor (not shown) to rotate and drive the rotor. Further, the roller press machine 200 includes an aggregate supply part 240 above the first roller gap G1 between the first roller 210 and the second roller 220 to supply the particle aggregate 22 formed of the wet particles 21 into the first roller gap G1.

The first undried film formation process S2 is performed successively from the first particle aggregate manufacturing process S1. Namely, the extruder 150 and the roller press machine 200 are arranged such that the particle aggregate 22 formed by the extruder 150 is put into the aggregate supply part 240 of the roller press machine 200.

Figure 13:
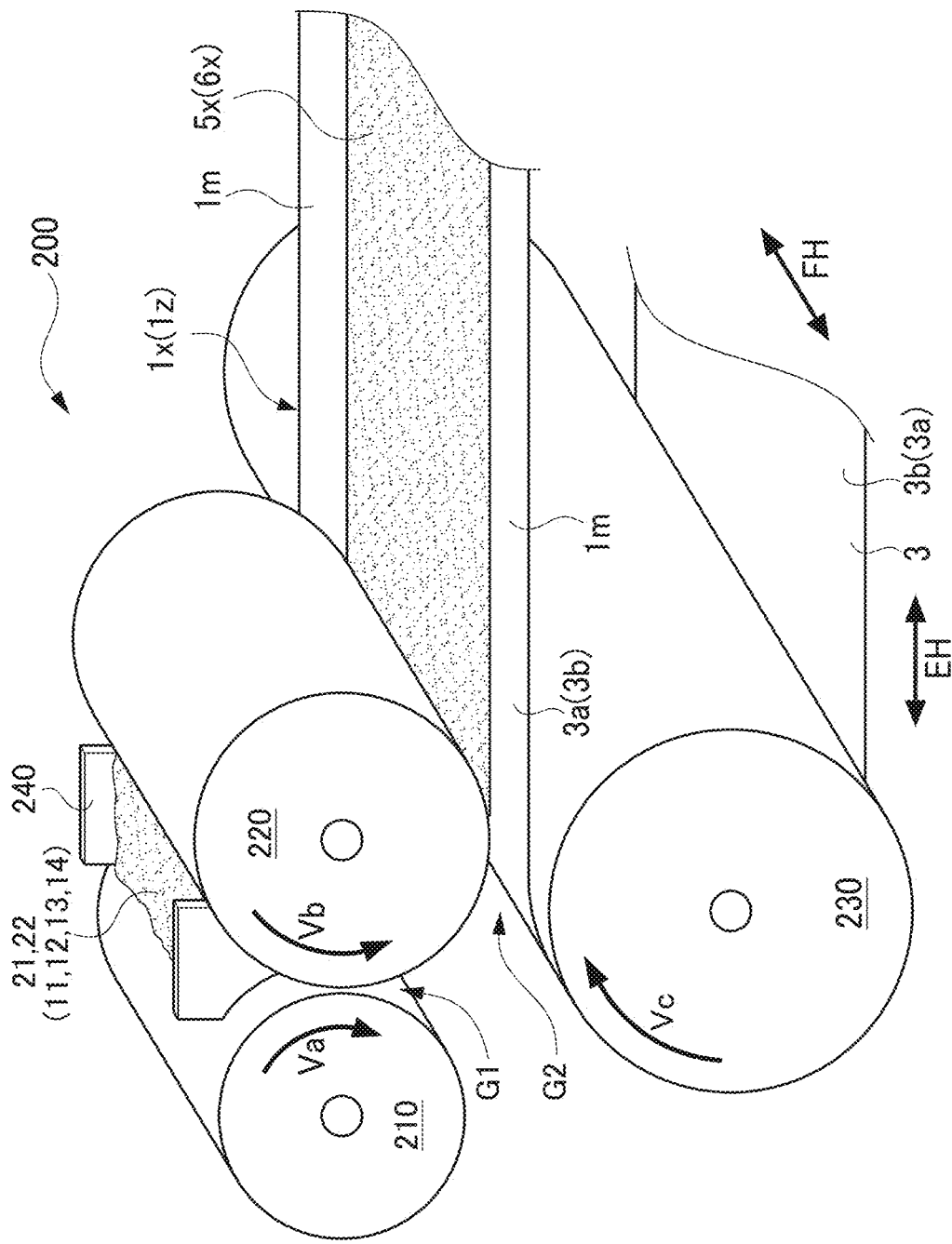
FIG. 13 is an explanatory view showing a way of forming an undried active material film on a current collecting foil by use of a roller press machine according to the manufacturing method of the positive electrode plate in the embodiment.

In performing the first undried film formation process S2, the first roller 210, the second roller 220, and the third roller 230 are each rotated in the respective rotating directions as indicated in FIG. 13. To be specific, the first roller 210 and the third roller 230 are rotated in the same rotation direction (in a clockwise direction in the present embodiment), and the second roller 220 is rotated in an opposite direction from the first roller 210 and the third roller 230 (in a counter-clockwise direction in the present embodiment). Further, a circumferential speed Vb of the second roller 220 is made faster than a circumferential speed Va of the first roller 210, and a circumferential speed Vc of the third roller 230 is made further faster than the circumferential speed Vb of the second roller 220 (Va<Vb<Vc).

In "a first film formation step S21" of the first undried film formation process S2, the particle aggregate 22 is made to pass through the first roller gap G1 between the first roller 210 and the second roller 220 for rolling, so that the first undried active material film 5x is formed on the second roller 220. Specifically, the particle aggregate 22 is put into the aggregate supply part 240 of the roller press machine 200 from the extruder 150, and then, this particle aggregate 22 is supplied into the first roller gap G1 between the first roller 210 and the second roller 220, rolled by the first roller 210 and the second roller 220, pushed out downward in FIG. 13 as the film-like undried active material film 5x, and thus formed on the second roller 220. This undried active material film 5x on the second roller 220 is conveyed to the third roller 230.

Subsequently, in "a first transfer step S22" of the first undried film formation process S2, the current collecting foil 3 is made to pass through the second roller gap G2 between the second roller 220 and the third roller 230, and the first undried active material film 5x on the second roller 220 is transferred on this current collecting foil 3. To be more specific, the current collecting foil 3 that has been taken out of a supply roller (not shown) is wound about the third roller 230 so that the current collecting foil 3 is conveyed by the third roller 230. The current collecting foil 3 has been conveyed by the third roller 230 and comes into contact with the first undried active material film 5x placed on the second roller 220 in between the second roller 220 and the third roller 230. Thus, the first undried active material film 5x is transferred on a first primary surface 3a of the current collecting foil 3 between the second roller 220 and the third roller 230, so that the first undried active material film 5x is continuously formed on the primary surface 3a of the current collecting foil 3. Herein, a positive electrode plate having the first undried active material film 5x transferred on the current collecting foil 3 is also called as an undried one-side-coated positive electrode plate 1x.

Subsequently, in "a first drying process S3", the first undried active material film 5x on the current collecting foil 3 is dried to form the first active material layer 5. Specifically, the undried one-side-coated positive electrode plate 1x is conveyed into a drying unit (not shown) and hot air is blown to the first undried active material film 5x of the undried one-side-coated positive electrode plate 1x so that the dispersion medium 14 remaining in the first undried active material film 5x is evaporated, and thus the first active material layer 5 is produced. Herein, the positive electrode plate having the first active material layer 5 on the current collecting foil 3 is called as a one-side-coated positive electrode plate 1y.

On the other hand, in "a second particle aggregate manufacturing process S4", "a first step S41", "a second step S42", and "a third step S43" are successively performed (see FIG. 10) as similar to the above first particle aggregate manufacturing process S1 to continuously produce the wet particles 22 in which the wet particles 21 are aggregated. Specifically, in the first step S41, the conductive particles 12 and the binder dispersion 15 in which the binder 13 is dispersed in the dispersion medium 14 are mixed to obtain the first mixture 16 by the separately provided double-shaft kneader 100 mentioned above. Subsequently, as the second step S42, the active material particles 11 are added and kneaded with the first mixture 16 in this double-shaft kneader 100 to obtain the clay-like mixture 17. In the following third step S43, the separately provided extruder 150 mentioned above is used for forming the particle aggregate 22 formed of the aggregated wet particles 21 from the clay-like mixture 17.

Subsequently, in "a second undried film formation process S5", "a second film formation step S51" and "a second transfer step S52" are successively performed as similar to the above-mentioned first undried film formation process S2 to produce the second undried active material film 6x which is formed by rolling the particle aggregate 22 on another surface on the current collecting foil 3. Specifically, the separately provided roller press machine 200 mentioned above is used to form the second undried active material film 6x on the second roller 220 from the particle aggregate 22 in the second film formation step S51. Subsequently, in the second transfer step S52, the second undried active material film 6x on the second roller 220 is transferred on a second primary surface 3b of the current collecting foil 3 of the one-side-coated positive electrode plate 1y which has been conveyed by the third roller 230. Thus, a one-side-dried both-side-coated positive electrode plate 1z is formed with the dried first active material layer 5 on the first primary surface 3a of the current collecting foil 3 and with the undried second undried active material film 6x on the second primary surface 3b of the current collecting foil 3.

Subsequently, in "a second drying process S6", the second undried active material film 6x on the current collecting foil 3 is dried as similar to the above-mentioned first drying process S3 to produce the second active material layer 6. To be specific, the one-side-dried both-side-coated positive electrode plate 1z is conveyed to a drying unit (not shown) and hot air is blown to the second undried active material film 6x of the one-side-dried both-side-coated positive electrode plate 1z to form the second active material layer 6. Finally, a positive electrode plate (a pre-pressing positive electrode plate 1w) having the current collecting foil 3, the first active material layer 5, and the second active material layer 6 (a pre-pressing positive electrode plate 1w) is produced.

Subsequently, in "a pressing process S7", the above-mentioned pre-pressing positive electrode plate 1w is pressed by a roller pressing device (not shown) so that density of each of the first active material layer 5 and the second active material layer 6 is increased. The positive electrode plate 1 shown in FIG. 1 is thus completed.

Examples and Comparative Examples

Now results of a test for verifying effects of the present disclosure are explained. An example 4 adopts a positive electrode plate 1 manufactured similarly to the present embodiment by using similar active material particles 11 (LiNiCoMn oxide particles) and similar conductive particles 12 (AB particles) with the present embodiment to form a particle aggregate 22 to be used for the positive electrode plate 1. Specifically, as shown in Table 1, the active material particles 11 with a bulk density of 1.12 g/cm$^3$ and the conductive particles 12 with a bulk density of 0.06 g/cm$^3$ are each adopted in the example 4 in which the bulk density ratio (the active material particles/the conductive particles) is determined at a ratio of 1.12/0.06=18.7.

The first active material layer 5 and the second active material layer 6 of this example 4 include the active material particles 11 of 94.5 wt %, the conductive particles 12 of 4.0 wt %, and the binder 13 of 1.5 wt %. The active material particles 11 thus account for a large compounding ratio, and accordingly, a battery including this positive electrode plate 1 has sufficiently high energy density (Wh/kg) which is indicated with "Excellent" in the Table 1.

TABLE 1

|  | Bulk Density Ratio | Bulk Density of Active Material Particles (g/cm$^3$) | Bulk Density of Conductive Particles (g/cm$^3$) | State of Active Material Layer | | Energy Density |
|---|---|---|---|---|---|---|
|  |  |  |  | Dot-like Defects | Dispersibility |  |
| Comparative Ex. 1 | 6.4 | 1.59 | 0.25 | Poor | Fair | Fair |
| Comparative Ex. 2 | 7.5 | 1.12 | 0.15 | Poor | Fair | Good |
| Comparative Ex. 3 | 10.6 | 1.59 | 0.15 | Poor | Fair | Good |
| Comparative Ex. 4 | 18.7 | 1.12 | 0.06 | Poor | Poor | Excellent |
| Comparative Ex. 5 | 26.5 | 1.59 | 0.06 | Poor | Poor | Excellent |
| Example 1 | 6.4 | 1.59 | 0.25 | Good | Good | Fair |
| Example 2 | 7.5 | 1.12 | 0.15 | Good | Good | Good |
| Example 3 | 10.6 | 1.59 | 0.15 | Good | Good | Good |
| Example 4 | 18.7 | 1.12 | 0.06 | Good | Good | Excellent |
| Example 5 | 26.5 | 1.59 | 0.06 | Good | Good | Excellent |

An example 5 adopts the active material particles 11 having a bulk density different from the present embodiment (the bulk density of 1.59 g/cm$^3$) and having the similar component with the present embodiment other than the active material particles 11 to form the particle aggregate 22, and the positive electrode plate 1 of the example 5 is manufactured by the similar method to the present embodiment. The bulk density ratio (the active material particles/the conductive particles) in this example 5 is thus defined at a ratio of 1.59/0.06=26.5. Further, in the positive electrode plate 1 of the example 5, as similar to the positive electrode plate 1 of the example 4, each of the first active material layer 5 and the second active material layer 6 includes the active material particles 11 of 94.5 wt % and the conductive particles 12 of 4.0 wt %. Accordingly, similarly to the example 4, a battery adopting this positive electrode plate 1 has sufficiently high energy density (Wh/kg) as indicated with "Excellent" in the Table 1.

An example 1 adopts the active material particles 11 with the bulk density of 1.59 g/cm$^3$ and the conductive particles 12 with the bulk density of 0.25 g/cm$^3$ to form the particle aggregate 22, and the positive electrode plate 1 is formed of this particle aggregate 22. The bulk density ratio (the active material particles/the conductive particles) in this Example 1 is thus defined at a ratio of 1.59/0.25=6.4.

However, increase in the bulk density of the conductive particles 12 relative to the bulk density of the active material particles 11, namely, reduction in the bulk density ratio (the active material particles/the conductive particles) has been confirmed to lessen conductivity of the first active material layer 5 and the second active material layer 6. Accordingly, in the example 1, the compounding ratio of the conductive particles 12 is increased from 4.0 wt % to 9.0 wt % and instead the compounding ratio of the active material particles 11 is reduced from 94.5 wt % to 89.5 wt % so that the conductivity of the first active material layer 5 and the second active material layer 6 becomes similar to the conductivity of the first active material layer 5 and the second active material layer 6 of the examples 4 and 5.

This reduction in the compounding ratio of the active material particles 11 in the first active material layer 5 and the second active material layer 6 results in decrease in the energy density (Wh/kg) of the battery including the positive electrode plate 1, as indicated as "Fair" in the Table 1 which is lower than the energy density of the battery utilizing the positive electrode plate 1 in the examples 4 and 5.

An example 2 adopts the active material particles 11 with the bulk density of 1.12 g/cm$^3$ and the conductive particles 12 with the bulk density of 0.15 g/cm$^3$ to form the particle aggregate 22, and the positive electrode plate 1 is formed of this particle aggregate 22. The bulk density ratio (the active material particles/the conductive particles) in the example 2 is thus defined at a ratio of 1.12/0.15=7.5.

In this example 2, the bulk density ratio (the active material particles/the conductive particles) is smaller than that of the examples 4 and 5, and accordingly, the compounding ratio of the conductive particles 12 is increased from 4.0 wt % to 6.0 wt % and the compounding ratio of the active material particles 11 is instead reduced from 94.5 wt % to 92.5 wt % so that the conductivity of the first active material layer 5 and the second active material layer 6 in the example 2 becomes similar to that of the first active material layer 5 and the second active material layer 6 in the examples 4 and 5.

In this example 2, the compounding ratio of the active material particles 11 in the first active material layer 5 and the second active material layer 6 is increased more than the example 1 but less than the examples 4 and 5. Namely, the energy density (Wh/kg) of the battery utilizing the positive electrode plate 1 in the example 2 is higher than the energy density of the battery utilizing the positive electrode plate 1 in the example 1 as indicated as "Fair" in the Table 1, but is lower than the energy density of the battery utilizing the positive electrode plate 1 in the examples 4 and 5.

An example 3 adopts the active material particles 11 with the bulk density of 1.59 g/cm$^3$ and the conductive particles 12 with the bulk density of 0.15 g/cm$^3$ to form the particle aggregate 22, and the positive electrode plate 1 is formed with this particle aggregate 22. The bulk density ratio (the active material particles/the conductive particles) in this example 3 is defined at a ratio of 1.59/0.15=10.6.

The bulk density ratio (the active material particles/the conductive particles) in this example 3 is less than the bulk density ratio of the examples 4 and 5, and accordingly, the compounding ratio of the conductive particles 12 is increased from 4.0 wt % to 5.5 wt % and the compounding ratio of the active material particles 11 is instead reduced from 94.5 wt % to 93.0 wt % in the example 3 so that the conductivity of the first active material layer 5 and the second active material layer 6 becomes similar to the conductivity of the first active material layer 5 and the second active material layer 6 of the examples 4 and 5.

In the example 3, the compounding ratio of the active material particles 11 in the first active material layer 5 and the second active material layer 6 is more than those in the examples 1 and 2, but less than those in the examples 4 and 5. Accordingly, the energy density (Wh/kg) of the battery utilizing this positive electrode plate 1 is, as indicated as "Good" in the Table 1, higher than the energy density of the battery utilizing the electrode plate 1 of the examples 1 and 2, but lower than the energy density of the battery utilizing the electrode plate 1 in the examples 4 and 5.

As shown in the Table 1, comparative examples 1 to 5 are prepared with active material particles 11 and conductive particles 12 which are similar to those of the examples 1 to 5. In the comparative examples 1 to 5, an agitation-type mixer granulator capable of mixing and granulating material is used to concurrently mix the active material particles 11, the conductive particles 12, and the binder dispersion 15 in which the binder 13 is dispersed in the dispersion medium 14 and granulated, so that the particle aggregate 922 formed of the wet particles 921 is obtained. This particle aggregate 922 is then used for producing the positive electrode plate as similar to the present embodiment.

Herein, energy density of batteries formed of the positive electrode plate in each of the comparative examples 1 to 5 is theoretically same with the energy density of the respective batteries adopting the positive electrode plates 1 in the corresponding examples 1 to 5, and therefore, theoretical evaluation of the energy density of the comparative examples is made similarly to the examples 1 to 5. In the comparative examples 1 to 5, however, the first active material layer and the second active material layer are hardly formed with good dispersibility of the active material particles 11 and the conductive particles 12 as to be mentioned later. Accordingly, the actual energy density of the battery adopting the positive electrode plate in the comparative examples 1 to 5 is lower than the actual energy density of the battery adopting the positive electrode 1 of the corresponding examples 1 to 5.

Subsequently, state of every active material layer (the first active material layers and the second active material layers) of the respective positive electrode plates in the examples 1 to 5 and the comparative examples 1 to 5 is evaluated. To be specific, existence of dot-like defects in the first active material layers and the second active material layers is visually inspected. Herein, this "dot-like defects" are defects occurring when the particle aggregates have a large range of variation in the compounding ratio of the binder dispersion 15 included in the wet particles, and thus the dot-like defects are different in their form and a mechanism of formation from the above-mentioned "streak-like defects" (defects occurring when a range of the particle-size variation of the wet particles is large). Further, the dispersibility of the active material particles 11 and the conductive particles 12 both in the first active material layers and the second active material layers is determined by the above-mentioned luminance analysis test. The test results show that the first active material layers and the second active material layers of the positive electrode plates in the comparative examples 1 to 5 are confirmed to generate the dot-like defects as indicated with "Poor" in the Table 1. Further, in the first active material layers and the second active material layers of the positive electrode plates in the comparative examples 1 to 3, the active material particles 11 and the conductive particles 12 are not uniformly dispersed as indicated with "Fair" in the Table 1. Further, the first active material layers and the second active material layers of the positive electrode plates in the comparative examples 4 and 5 result in unfavorable dispersibility of the active material particles 11 and the conductive particles 12 as indicated as "Poor" in the Table 1 as compared to the comparative examples 1 to 3.

On the other hand, the first active material layers 5 and the second active material layers 6 of the positive electrode plates 1 in the examples 1 to 5 have no dot-like defects as indicated with "Good" in the Table 1. Furthermore, in the first active material layers 5 and the second active material layers 6 of the positive electrode plates 1 in the examples 1 to 5, the active material particles 11 and the conductive particles 12 are uniformly dispersed as indicated with "Good" in the Table 1.

Reasons for bringing the above results are considered as follows. The particle aggregates 922 according to the comparative examples 1 to 5 have a large range of variation in the compounding ratio of the binder dispersion 15 included in the wet particles 921. The wet particle 921 including a large amount of the binder dispersion 15 is hard to be transferred on the current collecting foil 3 from the second roller 220 of the roller press machine 200, and this transfer failure of the wet particle 921 on the current collecting foil 3 causes the dot-like defects on the first undried active material film and the second undried active material film. Accordingly, the first active material layer and the second material layer, which are formed by drying the first undried active material film and the second undried active material film, respectively, are also considered to cause the dot-like defects.

Further, the active material particles 11 and the conductive particles 12 are hardly dispersed uniformly in the agitation-type mixer granulator, and thus, in the comparative examples 1 to 5, the wet particles 921 are formed by the active material particles 11 and the conductive particles 12 which are not uniformly dispersed in the wet particles 921. Especially when the bulk density ratio (the active material particle/the conductive particle) of the active material particles 11 to the conductive particles 12 is 15 or more, and when the bulk density of the conductive particles 12 is 0.08 g/cm$^3$ or less, the active material particles 11 and the conductive particles 12 are hard to be uniformly dispersed. Therefore, in the comparative examples 4 and 5, the wet particles 921 are likely to be formed of the active material particles 11 and the conductive particles 12 which are less uniformly dispersed in the wet particles 921 further than in the comparative examples 1 to 3.

When the wet particles 921 in the comparative examples 1 to 5 are each rolled to form the first undried active material film and the second undried active material film, the first undried active material film and the second undried active material film turn out to be the ones in which the active material particles 11 and the conductive particles 12 are not uniformly dispersed. Especially in the comparative examples 4 and 5, the first undried active material film and the second undried active material film are formed of the active material particles 11 and the conductive particles 12 which are not uniformly dispersed. As a result of this, the first active material layer and the second active material layer, which are respectively formed by drying the first undried active material film and the second undried active material film, also become the first active material layer and the second active material layer in which the active material particles 11 and the conductive particles 12 are not uniformly dispersed. Especially in the comparative examples 4 and 5, the first active material layer and the second active material layer are considered to be formed of the unevenly-dispersed active material particles 11 and the unevenly-dispersed conductive particles 12.

On the contrary, the particle aggregates 22 in the examples 1 to 5 have less variation in the compounding ratio of the binder dispersion 15 included in the wet particles 21. Accordingly, the first undried active material film 5x and the second undried active material film 6x hardly generate the dot-like defects. The first active material layer 5 and the second active material layer 6 which are formed by drying the first undried active material film 5a and the second undried active material layer 6x are also considered to generate less dot-like defects.

In the examples 1 to 5, the first particle aggregate manufacturing process S1 and the second particle aggregate manufacturing process S4 including the above-mentioned first steps S11 and S41, the second steps S12 and S42, and the third steps S13 and S43 are each carried out to form the particle aggregate 22, and thereby, the wet particles 21 are formed with uniform dispersion of the active material particles 11 and the conductive particles 12 irrespective of a value of the bulk density ratio (the active material particles/the conductive particles) of the active material particles 11 to the conductive particles 12 and irrespective of a value of the bulk density of the conductive particles 12.

Therefore, formation of the first undried active material film 5x and the second undried active material film 6x by rolling the wet particles 21 of the examples 1 to 5 can result in obtention of the first undried active material film 5x and the second undried active material film 6x in which the active material particles 11 and the conductive particles 12 are uniformly dispersed. Further, the first active material layer 5 and the second active material layer 6 each of which is formed by respectively drying the first undried active material film 5x and the second undried active material film 6x can also be formed as the first active material layer 5 and the second active material layer 6 in which the active material particles 11 and the conductive particles 12 are uniformly dispersed.

The positive electrode plates 1 of the examples 1 to 5 are favorable since any one of the first active material layers 5 and the second active material layers 6 has no dot-like defects and the active material particles 11 and the conductive particles 12 are uniformly dispersed, but those positive electrode plates 1 have differences in their energy density (Wh/kg) in batteries when the batteries are produced by those positive electrode plates 1. Specifically, in the positive electrode plates 1 of the examples 1 to 3 in each of which the bulk density ratio (the active material particles/the conductive particles) of the active material particles 11 to the conductive particles 12 is less than 15, the energy density of the produced battery is low. Especially in the positive electrode plate 1 of the example 1 in which the bulk density ratio (the active material particles/the conductive particles) is less than 7, the energy density of the battery is considerably low. Accordingly, it is preferable to arrange the bulk density ratio (the active material particles/the conductive particles) of the active material particles 11 to the conductive particles 12 as 15 or more as arranged in the examples 4 and 5.

As explained in detail above, in the manufacturing method of the particle aggregate 22, the conductive particles 12 and the binder dispersion 15 are firstly mixed in the first steps S11 and S41 to obtain the first mixture 16. On the other hand, when the active material particles 11 and the conductive particles 12 having different bulk density from each other are to be concurrently mixed with the viscous binder dispersion 15 including the binder 13 dispersed in the dispersion medium 14, there may be difficulty in uniform dispersion of the active material particles 11, the conductive particles 12, the binder 13, and the dispersion medium 14. To address this, when only the conductive particles 12 are mixed with the viscous binder dispersion 15 except the active material particles 11 in the first place, the conductive particles 12 can be uniformly dispersed in the binder dispersion 15. Accordingly, the first mixture 16 in which the conductive particles 12, the binder 13, and the dispersion medium 14 are uniformly dispersed can be obtained in the first steps S11 and S41.

In the subsequent second steps S12 and S42, the first mixture 16 is kneaded with the active material particles 11 to obtain the clay-like mixture 17. The first mixture 16 is thus formed in advance in the first steps S11 and S41, and then this first mixture 16 and the active material particles 11 are kneaded, thus achieving uniform dispersion of the active material particles 11, the conductive particles 12, the binder 13, and the dispersion medium 14. Accordingly, in these steps S12 and S42, the clay-like mixture 17 in which the active material particles 11, the conductive particles 12, the binder 13, and the dispersion medium 14 are uniformly dispersed can be obtained.

Thereafter, in the third steps S13 and S43, the particle aggregate 22 in which the wet particles 21 are aggregated can be produced from the clay-like mixture 17. The clay-like mixture 17 includes the active material particles 11, the conductive particles 12, the binder 13, and the dispersion medium 14 which are uniformly dispersed, and therefore, the wet particles 21 also include the active material particles 11, the conductive particles 12, the binder 13, and the dispersion medium 14 which are uniformly dispersed. According to the above manufacturing method, therefore, the particle aggregate 22 formed of the aggregated wet particles 21 can be manufactured such that the wet particles 22 have less variation in a compounding ratio of the binder dispersion 15 included in the wet particles 21 and that the active material particles 11 and the conductive particles 12 are uniformly dispersed in the wet particles 21.

Further, in the manufacturing method of the particle aggregate 22 according to the present embodiment, the conductive particles 12 and the binder dispersion 15 are firstly mixed in the first steps S11 and S41 to obtain the first mixture 16 in which the conductive particles 12, the binder 13, and the dispersion medium 14 are uniformly dispersed, and then the first mixture 16 and the active material particles 11 are kneaded in the second steps S12 and S42 as explained above. Accordingly, the active material particles 11, the conductive particles 12, the binder 13, and the dispersion medium 14 are uniformly dispersed even if the bulk density ratio (the active material particles/the conductive particles) of the active material particles 11 to the conductive particles 12 is large, or even if the bulk density of the conductive particles 12 is small. This results in obtention of the clay-like mixture 17 in which the active material particles 11, the conductive particles 12, the binder 13, and the dispersion medium 14 are uniformly dispersed irrespective of the large bulk density ratio (the active material particles/the conductive particles) or irrespective of the small bulk density of the conductive particles 12. After that, the particle aggregate 22 formed of the wet particles 21 in which the active material particles 11, the conductive particles 12, the binder 13, and the dispersion medium 14 are uniformly dispersed can be obtained from this clay-like mixture 17 in the third steps S13 and S43. According to the manufacturing method of the present embodiment, even if the bulk density ratio (the active material particles/the conductive particles) is 15 or more and the bulk density of the conductive particles 12 is 0.08 g/cm$^3$ or less, the particle aggregate 22 can be produced by assembling the wet particles 21 in which the active material particles 11 and the conductive particles 12 are uniformly dispersed.

In the manufacturing method of the particle aggregate 22 according to the present embodiment, the clay-like mixture 17 is pushed out from the push-out hole 165$h$ of the extruder 150 and then cut to granulate the columnar wet particles 21 in the third steps S13 and S43. Accordingly, the thus formed wet particles 21 have less particle-size variation as compared to the wet particles 921 formed by the agitation-type mixer granulator in the comparative embodiment. Thus, when the first undried active material film 5$x$ and the second undried active material film 6$x$ are formed by the roller press machine 200, the wet particles 21 are prevented from getting stuck in the first roller gap G1 between the first roller 210 and the second roller 220, thereby preventing occurrence of the streak-like defects in the first undried active material film 5$x$ and the second undried active material film 6$x$ formed on the second roller 220 and the streak-like defects in the first undried active material film 5$x$ and the second undried active material film 6$x$ transferred onto the current collecting foil 3. The first active material layer and the second active material layer of the positive electrode plate according to each of the above-mentioned comparative examples 1 to 5 have the streak-like defects in addition to the dot-like defects. This is because a variation range of the particle-size of the wet particles 921 is large. On the other hand, in the first active material layer 5 and the second active material layer 6 of the positive electrode plate 1 of each of the examples 1 to 5, not only the dot-like defects but also the streak-like defects are prevented from occurring.

In the manufacturing method of the particle aggregate 22 according to the present embodiment, the wet particles 21 are granulated into columnar particles each having a diameter D and a height H 0.5 to 2.0 times as long as the diameter D (H=D in the present embodiment). The thus formed wet particles 21 have less particle diameter variation than the wet particles 921 formed by use of the agitation-type mixer granulator in the comparative embodiment. Further, each of the wet particles 21 has the height H that is not too short and not too long with respect to the diameter D, thus further preventing the wet particles 21 from getting stuck in the first roller gap G1 between the first roller 210 and the second roller 220 when the first undried active material film 5x and the second undried active material film 6x are formed by the roller press machine 200. As a result of this, the first undried active material film 5x and the second undried active material film 6x formed on the second roller 220 and the first undried active material film 5x and the second undried active material film 6x transferred on the current collecting foil 3 can prevent occurrence of the streak-like defects.

In the manufacturing method of the particle aggregate 22 according to the present embodiment, the first step S11 and the second step S12 are successively performed and the first step S41 and the second step S42 are successively performed to continuously produce the clay-like mixture 17, thus producing the clay-like mixture 17 highly efficiently.

In the manufacturing method of the particle aggregate 22 according to the present embodiment, the conductive particles 12 and the binder dispersion 15 are mixed by the double-shaft kneader 100 to form the first mixture 16 in the first steps S11 and S41, so that the first mixture 16 is easily and continuously formed. Further, in the second steps S12 and S42, the active material particles 11 are added to the first mixture 16 in this double-shaft kneader 100 and kneaded to produce the clay-like mixture 17. Consequently, the first steps S11 and S41 proceed to the second steps S12 and S42, respectively, and the clay-like mixture 17 can be easily and continuously formed.

In the manufacturing method of the particle aggregate 22 according to the present embodiment, the second steps S12 and S42 proceed to the third steps S13 and S43, respectively. Accordingly, the first step S11, the second step S12, and the third step S13 can be successively performed, and the first step S41, the second step S42, and the third step S43 can be successively performed, thus continuously producing the particle aggregate 22.

Further, the first steps S11 and S41, the second steps S12 and S42, and the third steps S13 and S43 are successively performed by use of the double-shaft kneader 100 and the extruder 150 placed downstream of the double-shaft kneader 100, respectively. Thus the particle aggregate 22 can be easily and continuously produced.

In the manufacturing method of the positive electrode plate 1 according to the present embodiment, the particle aggregate 22 is formed by the above-mentioned manufacturing method of the particle aggregate 22 in the first particle aggregate manufacturing process S1 and the second particle aggregate manufacturing process S4. The thus formed particle aggregate 22 is formed of the wet particles 21 having a small range of variation in the compounding ratio of the binder dispersion 15 included in the wet particles 21 and achieving uniform dispersion of the active material particles 11 and the conductive particles 12 inside the wet particles 21. Accordingly, the first undried active material film formation process S2 and the second undried active material film formation process S5 can provide the first undried active material film 5x and the second undried active material film 6x in which no dot-like defects are generated and the active material particles 11 and the conductive particles 12 are uniformly dispersed. Furthermore, the first drying process S3 and the second drying process S6 can provide the first active material layer 5 and the second active material layer 6 in which no dot-like defects occur and the active material particles 11 and the conductive particles 12 are uniformly dispersed.

In the manufacturing method of the positive electrode plate 1 according to the present embodiment, the first particle aggregate manufacturing process S1, the first undried active material film formation process S2, and the first drying process S3 are successively performed to continuously form the first active material layers 5, and the second particle aggregate manufacturing process S4, the second undried film formation process S5, and the second drying process S6 are successively performed to continuously form the second active material layers 6. Thus, the positive electrode plate 1 can be efficiently produced.

In the manufacturing method of the positive electrode plate 1 according to the present embodiment, the first undried film formation process S2 includes the first film formation step S21 and the first transfer step S22, and the second undried film formation process S5 includes the second film formation step S51 and the second transfer step S52. Through prosecution of these steps, the first undried active material film 5x and the second undried active material film 6x are formed on the current collecting foil 3. Accordingly, the first undried active material film 5x and the second undried active material film 6x can be easily formed on the current collecting foil 3, and moreover, the undried one-side-coated positive electrode plate 1x having the first undried active material film 5x on the current collecting foil 3 or the one-side-coated both-side-coated positive electrode plate 1z having the second undried active material film 6x on the current collecting foil 3 can be continuously produced.

While the presently preferred embodiment of the present disclosure has been shown and described above, it is to be understood that the present disclosure is not limited to the above embodiment and may be embodied in other specific forms without departing from the essential characteristics thereof.

For example, the embodiment exemplifies the particle aggregate 22 for the positive electrode plate that is used for forming the active material layer (the first active material layer 5 and the second active material layer 6) of the positive electrode plate 1, but the present disclosure is not limited to this. Alternatively, the present disclosure may be embodied with a particle aggregate for a negative electrode plate used for forming an active material layer of the negative electrode plate and a manufacturing method of the negative electrode plate.

REFERENCE SIGNS LIST

1 Positive electrode plate (Electrode plate)
3 Current collecting foil
5 First active material layer
5x First undried active material film
6 Second active material layer
6x Second undried active material film
11 Active material particle
12 Conductive particle
13 Binder
14 Dispersion medium
15 Binder dispersion
16 First mixture 17 Clay-like mixture
21 Wet particle
22 Particle aggregate
100 Double-shaft kneader
150 Extruder
165h Push-out hole
200 Roller press machine
210 First roller
220 Second roller
230 Third roller
D Diameter
H Height
BH Pressing direction
CH Orthogonal direction
G1 First roller gap
G2 Second roller gap
S1 First particle aggregate manufacturing process (Particle aggregate manufacturing process)
S11 First step
S12 Second step
S13 Third step
S2 First undried film formation process (Undried firm formation process)
S21 First film formation step (Film formation step)
S22 First transfer step (Transfer step)
S3 First drying process (Drying process)
S4 Second particle aggregate manufacturing process (Particle aggregate manufacturing process)
S41 First step
S42 Second step
S43 Third step
S5 Second undried film formation process (Undried film formation process)
S51 Second film formation step (Film formation step)
S52 Second transfer step (Transfer step)
S6 Second drying process (Drying process)

What is claimed is:

1. A particle aggregate in which wet particles including active material particles, conductive particles, binder, and a dispersion medium are aggregated, wherein
the wet particles are formed of a clay-like mixture, and
the particle aggregate has a shear pressure of 0.3 MPa or less in a ductility test of pressing the particle aggregate with a pressure of 2.0 MPa and measuring a shear stress required for displacing the particle aggregate by 1.0 mm in an orthogonal direction perpendicular to a pressing direction.

2. The particle aggregate according to claim 1, wherein a bulk density ratio of the active material particles to the conductive particles (the active material particles/the conductive particles) is 15 or more.

3. The particle aggregate according to claim 2, wherein a bulk density of the conductive particles is 0.08 g/cm3 or less.

4. The particle aggregate according to claim 3, wherein each of the wet particles has a columnar shape having has a diameter and a height 0.5 to 2.0 times as long as the diameter.

5. The particle aggregate according to claim 2, wherein each of the wet particles has a columnar shape having a diameter and a height 0.5 to 2.0 times as long as the diameter.

6. The particle aggregate according to claim 1, wherein a bulk density of the conductive particles is 0.08 g/cm3 or less.

7. The particle aggregate according to claim 6, wherein each of the wet particles has a columnar shape having a diameter and a height 0.5 to 2.0 times as long as the diameter.

8. The particle aggregate according to claim 1, wherein each of the wet particles has a columnar shape having a diameter and a height 0.5 to 2.0 times as long as the diameter.

* * * * *